(12) United States Patent
Yoshida et al.

(10) Patent No.: US 6,865,666 B2
(45) Date of Patent: Mar. 8, 2005

(54) DATA PROCESSING DEVICE

(75) Inventors: Toyohiko Yoshida, Tokyo (JP); Hideyuki Fujii, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 625 days.

(21) Appl. No.: 09/146,259

(22) Filed: Sep. 3, 1998

(65) Prior Publication Data

US 2002/0002670 A1 Jan. 3, 2002

(30) Foreign Application Priority Data

Feb. 9, 1998 (JP) ............................................ 10-027158

(51) Int. Cl.$^7$ ................................................ G06F 9/38
(52) U.S. Cl. ..................... 712/234; 712/24; 712/208; 712/210; 712/241
(58) Field of Search ....................... 712/24, 208, 234, 712/241

(56) References Cited

U.S. PATENT DOCUMENTS

| | | | | |
|---|---|---|---|---|
| 4,792,892 A | * | 12/1988 | Mary et al. ................... | 712/241 |
| 4,910,664 A | * | 3/1990 | Arizono ........................ | 712/241 |
| 5,404,469 A | * | 4/1995 | Chung et al. ................ | 712/215 |
| 5,471,591 A | | 11/1995 | Edmondson et al. | |
| 5,495,598 A | | 2/1996 | Byers et al. | |
| 5,507,027 A | * | 4/1996 | Kawamoto .................... | 712/241 |
| 5,590,352 A | | 12/1996 | Zuraski, Jr. et al. | |
| 5,617,550 A | | 4/1997 | Matsuo et al. | |
| 5,752,015 A | * | 5/1998 | Henry et al. ................. | 712/241 |
| 5,761,470 A | * | 6/1998 | Yoshida ....................... | 712/210 |
| 5,765,037 A | * | 6/1998 | Morrison et al. ............ | 712/215 |
| 5,815,698 A | * | 9/1998 | Holmann et al. ............ | 712/237 |
| 5,941,984 A | * | 8/1999 | Mohri et al. ................. | 712/218 |
| 6,035,389 A | * | 3/2000 | Grochowski et al. ....... | 712/216 |
| 6,055,626 A | * | 4/2000 | Yasoshima et al. ......... | 712/216 |

FOREIGN PATENT DOCUMENTS

| | | |
|---|---|---|
| EP | 0 476 628 | 3/1992 |
| EP | 0 476 628 A2 | 3/1992 |
| EP | 0 518 420 A2 | 12/1992 |
| GB | 2 069 733 A | 8/1981 |
| GB | 2 069 733 | 8/1981 |
| JP | 08203675 * | 2/1998 |
| JP | 410049370 A * | 2/1998 |

OTHER PUBLICATIONS

Microprocessor Report, vol. 11, No. 14, Oct. 27, 1997.

* cited by examiner

*Primary Examiner*—William M. Treat
(74) *Attorney, Agent, or Firm*—Burns, Doane, Swecker & Mathis, L.L.P.

(57) ABSTRACT

A data processing device having a PC controlling part for executing an operation of branch which has a first register for holding a result of decoding in an instruction decode unit, a register for holding a description indicating an execution condition of the operation (a value of field for designating condition), and a register for holding the description indicating a time for executing the operation (an address value of PC), wherein the execution condition is started when a value held in the register is in agreement with a PC value in accordance with the description of the register; and if the condition is satisfied, the PC controlling part executes the operation based on a content held in the register, whereby it is possible to delay the time for judging the execution condition during this delay, to thereby increase a degree of freedom in scheduling instructions such that the branch instruction is positioned prior to the operation instruction for determining the execution condition in the program.

25 Claims, 11 Drawing Sheets

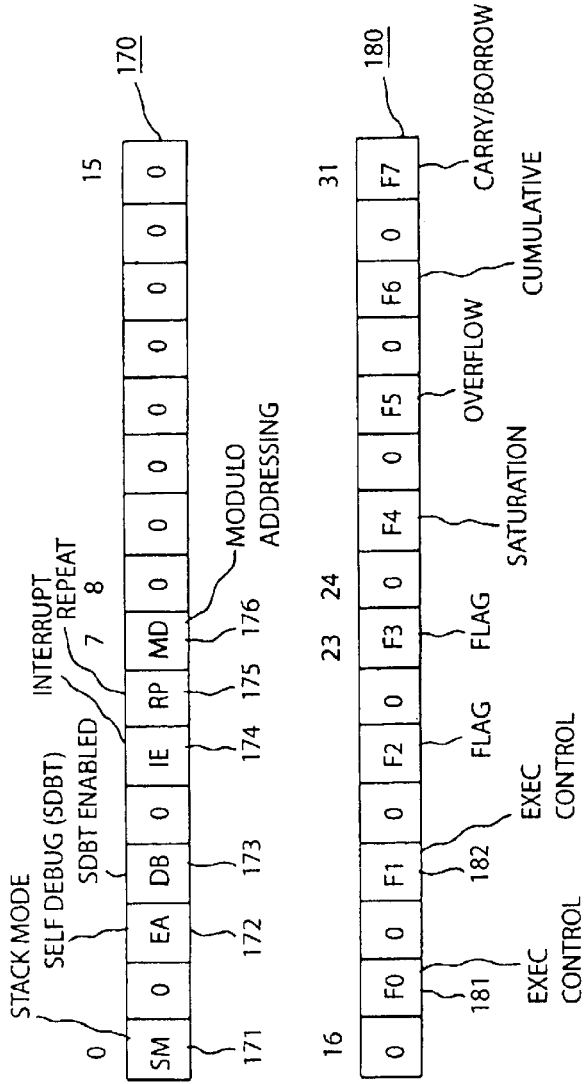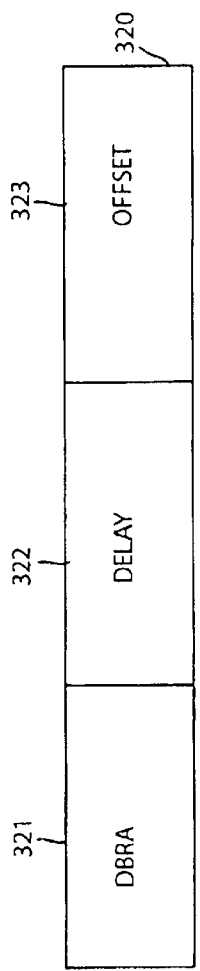

FIG.8

| INSTRUCTION ADDRESS | OPERATION_0 | OPERATION_1 |
|---|---|---|
| H'1000 | I01 (BRA FOF #H'20 loop) | I02: |
| H'1008 | loop:I11 | I12: |
| H'1010 | I21 (ADD R2,R2,R3) | I22: |
| H'1018 | I31 (CMPEO R2,R4,F0) | I32: |
| H'1020 | end:I41 | I42: |
| H'1028 | I51 | I52: |
| H'1030 | I61 | I62: |

FIG. 9

| CLOCK CYCLE | t1 | t2 | t3 | t4 | t5 | t6 | t7 | t8 | t9 | t10 | t11 | t12 | t13 |
|---|---|---|---|---|---|---|---|---|---|---|---|---|---|
| VALUE OF PC | H'0FF0 | H'0FF8 | H'1000 | H'1008 | H'1010 | H'1018 | H'1020 | H'1008 | H'1008 | H'1008 | H'1010 | H'1018 | H'1020 |
| I01(BRA) | IF | D/A | E/M | | | | E/M (JD) | | | | | | E/M (JD) |
| I02 | IF | D/A | E/M | W | | | | | | | | | |
| I11 | | IF | D/A | E/M | W | | | | | | | | |
| I12 | | IF | D/A | E/M | W | | | | | | | | |
| I21(ADD) | | | IF | D/A | E/M | W | | | | | | | |
| I22 | | | IF | D/A | E/M | W | | | | | | | |
| I31(CMPEQ) | | | | IF | D/A | E/M | W | | | | | | |
| I32 | | | | IF | D/A | E/M | W | | | | | | |
| I41 | | | | | IF | D/A | E/M | W | | | | | |
| I42 | | | | | IF | D/A | E/M | W | | | | | |
| I51 | | | | | | IF | D/A | E/M | W | | | | |
| I52 | | | | | | IF | D/A | E/M | W | | | | |
| I61 | | | | | | | IF | D/A | E/M | W | | | |
| I62 | | | | | | | IF | D/A | E/M | W | | | |
| I11 | | | | | | | | IF | D/A | E/M | W | | |
| I12 | | | | | | | | IF | D/A | E/M | W | | |

JD: JUDGING CONDITION

FIG. 10

| INSTRUCTION ADDRESS | OPERATION_0 | OPERATION_1 |
|---|---|---|
| H'1000 | I01 (DJMP FOT #H'18 #H'28 R5) | I02: |
| H'1008 | I11 (ADD R1,R1,R2) | I12: |
| H'1010 | I21 (CMPEQ R1,R3,F0) | I22: |
| H'1018 | I31 (ADD R5,R5,R6) | I32: |
| H'1020 | I41 | I42: |
| H'1028 | I51 | I52: |
| H'1030 | I61 | I62: |
| H'1038 | I71 | I72: |

FIG. 11

| CLOCK CYCLE | t1 | t2 | t3 | t4 | t5 | t6 | t7 | t8 | t9 | t10 | t11 | t12 | JD: JUDGING CONDITION |
|---|---|---|---|---|---|---|---|---|---|---|---|---|---|
| VALUE OF PC | H'0FF0 | H'0FF8 | H'1000 | H'1008 | H'1010 | H'1018 | H'1020 | H'1028 | H'2000 | H'2000 | H'2000 | H'2008 | |
| I01(DJMP) | IF | D/A | E/M | W | | | | | | | | | |
| I02 | IF | D/A | E/M | W | | | | | | | | | |
| I11(ADD) | | IF | D/A | E/M | W | | | | | | | | |
| I12 | | IF | D/A | E/M | W | | | | | | | | |
| I21(COMEQ) | | | IF | D/A | E/M | W | | | | | | | |
| I22 | | | IF | D/A | E/M | W | | | | | | | |
| I31(ADD) | | | | IF | D/A | E/M | W | | | | | | |
| I32 | | | | IF | D/A | E/M | W | | | | | | |
| I41 | | | | | IF | D/A | E/M | W | | | | | |
| I42 | | | | | IF | D/A | E/M | W | | | | | |
| I51 | | | | | | IF | D/A | E/M | W | | | | |
| I52 | | | | | | IF | D/A | E/M | W | | | | |
| I61 | | | | | | | IF | D/A | E/M | W | | | |
| I62 | | | | | | | IF | D/A | E/M | W | | | |
| I71 | | | | | | | | IF | D/A | E/M | W | | |
| I72 | | | | | | | | IF | D/A | E/M | W | | | t6: JD

INSTRUCTION IN ADDRESS NO. 2000

DATA PROCESSING DEVICE

FIELD OF THE INVENTION

The present invention relates to a data processing device for properly scheduling conditional operation instructions in a program sequence.

DISCUSSION OF BACKGROUND

Conventionally, in a microprocessor for executing sequentially a plurality of instructions by pipelines, execution of branch instruction is one reason for deteriorating processing efficiency of the processor because it disturbs the pipelines. In order to prevent the processing performance from deteriorating, for example, a technique of using a delay slot is proposed.

A case that a programmer makes the following instruction sequence 1 will be described.
[Instruction Sequence 1]
- (I0) CMPEQ r10, r11
- (I1) ADD r1, r2
- (I2) BRA F0=1 H'1000
- (I3) . . .
- (I4) . . .

An instruction I0 is a comparison instruction for setting a flag F0 if a register 10 and a register 11 are equal as a result of a comparison therebetween. An instruction I1 is an add instruction for writing the addition of a content of register r1 and a content of register r2 in the register r1. An instruction I2 is a conditional branch instruction for branching to an instruction in an address number 1000 of the memory. Instructions I3 and I4 are arbitrary instructions and already input in the microprocessor at a time for executing the instruction I2. When a branch is taken as a result of execution of the instruction I2, the instructions I3 and I4 under the pipeline processing are invalidated.

Accordingly, in consideration of the instruction I1, which is an instruction executed regardless of the branch by the instruction I2 and not an instruction of performing an operation of determining a branch condition of the instruction I2, a scheduling of the instructions as shown in the following instruction sequence 2.
[Instruction Sequence 2]
- (I0) CMPEQ r10, r11
- (I2) BRA F0=1H'1000
- (I1) ADD r1, r2
- (I5) NOP Even though a branch to the address number 1000 is determined as a result of the execution of instruction I2, the instruction I1, which is inputted into the pipeline and processed, can further be executed without invalidating the same, wherein in a case of architecture introducing two instructions into the pipeline at the time of executing the instruction I2, a delay slot is occupied by these two instructions. In the case of instruction sequence 2, a delay slot is constituted by the instruction I1 and the instruction I5. The instruction I5 is a so-called no operation (NOP) instruction. After the branch is taken by the instruction I2, an instruction after this branch will be fetched after the instruction I5.

Such a scheduling from the instruction sequence 1 to the instruction sequence 2 is performed by a program itself or a compiler.

Concerning such a scheduling of instructions, various techniques were proposed in "Computer Architecture: A Quantitative Approach, Morgan Kaufmann Co., year 1990".

Thus, a technology of scheduling instructions in a program was important in order to draw out a processing capability of a microprocessor as much as possible. However, there were various restrictions on the scheduling depending on a type of instruction. In the above case, the conditional branch instruction by the instruction I2 could not be posed before the instruction I0 determining the execution condition of the conditional branch instruction in their instruction sequence. This was because the execution of instruction I0 of determining the branch condition before instruction I2 referred to a content of the flag F0 which was the branch condition by the instruction I2. Thus, not only a conditional branch instruction but also a conditional arithmetic operation instruction, were reasons for deteriorating a degree of freedom in the scheduling of instruction.

In a microprocessor of a type of very long instruction word (VLIW), a plurality of instructions, which could be executed in parallel, were expressed by a single instruction set. In this type, it was necessary to use a high-level scheduling technology considering that which instructions could be executed in parallel, whereby many circumstances that instructions which were meaningless in respect of the program, namely, so-called no operation (NOP) instructions, were inserted in an instruction sequence occurred because of existence of conditional operation instructions. It was also a reason for deteriorating a processing performance of microprocessor to process an no operation (NOP) instruction.

SUMMARY OF THE INVENTION

It is an object of the present invention to solve the above-mentioned problems inherent in the prior art and to provide a circumstance under which a scheduling of instructions having a high degree of freedom is obtainable in a data processing for processing conditional operation instructions for a programmer.

According to a first aspect of the present invention, there is provided a data processing device comprising an instruction decoder for outputting a control signal corresponding to each operation instruction by successively decoding a plurality of coded operation instructions described in a program sequence and an instruction execution unit for executing operations which are respectively designated by the plurality of operation instructions in accordance with the control signals outputted from the instruction decoder, wherein a first operation instruction is decoded in a first period and the operation designated thereby is executed in a second period following the first period. Meanwhile, a second operation instruction, of which operation is executed under a predetermined condition, is decoded in a third period, it is judged whether the predetermined condition is satisfied in a fourth period, which is started after the same time as the second period or a longer time than the second period from the ending of the third period, and the instruction execution unit executes an operation designated by the second operation unit in response to a result of the judgment.

The data processing device further comprises a register for designating amount of delay that can variably set a hold value. The instruction execution unit starts a judgement of whether or not the second operation instruction satisfies the predetermined condition in response to a value held as an amount of delay in the register for designating amount of delay.

The coded second operation instruction has a field for designating operation and a field for designating amount of delay that designates an interval between the ending of the third period and the starting of the fourth period, wherein the amount of delay is set in the register for designating amount of delay in accordance with a content described in the field for designating amount of delay.

The data processing device further comprises a program counter for sequentially counting an address corresponding to each of a plurality of operation instructions and holding the address. The register for designating amount of delay is to hold an address value as an amount of delay. The instruction execution unit starts to judge whether or not the second operation instruction satisfies the predetermined condition in response to an event that the address value held in the register for designating amount of delay is in agreement with the value in the program counter.

The instruction execution unit judges whether or not the predetermined condition is satisfied in a fifth period included in the fourth period. In this, the instruction execution unit executes an operation designated by the second operation instruction when the predetermined condition is satisfied in a sixth period included in the fourth period and starting after passing the same time as the second period or a longer time than the second period from the ending of the fifth period.

The data processing device comprises a first register for designating amount of delay and a second register for designating amount of delay, in both of which respective hold values can be set variably. The instruction execution unit starts a judgement of whether or not the second operation instruction satisfies the predetermined condition in accordance with the hold value as a first amount of delay in the first register for designating amount of delay and executes by starting the operation designated by the second operation instruction when the second operation instruction satisfies the predetermined condition in accordance with the hold value held as a second amount of delay in the second register for designating amount of delay.

The coded second operation instruction comprises a field for designating operation, a first field for designating amount of delay which designates a time between the ending of the third period and the starting of the fourth period, and a second field for designating amount of delay which designates a time from the ending of the fifth period and the starting of the sixth period. The first register for designating amount of delay is set with a first amount of delay in accordance with a content described in the first field for designating amount of delay; and the second register for designating amount of delay is set with a second amount of delay in accordance with a content described in the second field for designating amount of delay.

The first register for designating amount of delay and the second register for designating amount of delay hold values of address respectively as the first amount of delay and the second amount of delay. The instruction execution unit starts a judgement of whether or not the predetermined condition is satisfied in response to an event that the value of address held in the first register for designating amount of delay is in agreement with a value of program counter. Further, the instruction execution unit starts to execute the operation designated by the second operation instruction when the predetermined condition is satisfied in response to an event that the value of address held in the second register for designating amount of delay is in agreement with the value of program counter.

With respect to a third operation instruction among a plurality of operation instructions, the instruction decoder decodes in a seventh period which starts after the third period, and an instruction execution unit designated by the third operation instruction in an eighth period, which starts after the seventh period, executes an operation; and a result of the operation is written in a predetermined memory location. At this time, the second operation instruction designates an operation instruction which would be executed in a case that the result of operation by the third operation instruction has a predetermined value; and the instruction execution unit determines whether or not the operation is executed in reference of the predetermined memory location so that the starting of the fourth period becomes at least after the eighth period.

The predetermined memory location is a flag or a register. The third operation instruction is a comparison instruction for comparing values of the two registers and writing a result of the comparison in the predetermined memory location. In this, the second operation instruction is a branch instruction, a jump instruction or an add instruction.

Each of the plurality of operation instructions has a field for designating operation that designates a content of the operation, a field for designating condition that designates an execution condition of the operation and a field for designating amount of delay that designates an amount by which timing for judging the execution condition is delayed.

A description of representing that the field for designating condition of the first operation instruction is unconditional is described provided that the first operation instruction is an instruction executable unconditionally. The instruction decoder outputs a first control signal in accordance with the field for designating operation in the first operation instruction and controls the instruction execution unit so as to execute the operation designated by the first operation instruction in the second period.

Further, when the first operation instruction is an unconditional operation instruction, a description representing a condition other than the predetermined condition of the second operation instruction and a description of judging said other condition in the first period are described respectively in the field for designating condition and the field for designating amount of delay.

The instruction decoder outputs the first control signal in accordance with the field for designating operation in the first operation instruction and controls the instruction execution unit to execute the operation designated by the first operation instruction in the second period based on the field for designating condition and the field for designating amount of delay.

The instruction decoder judges whether or not the condition is satisfied in accordance with the field for designating condition and the field for designating amount of delay in the first operation instruction to thereby output the first control signal in accordance with the field for designating operation in the first operation instruction in response to a result of the judgement.

In a field for designating condition and a field for designating amount of delay in the second operation instruction, a description representing predetermined conditions and a description representing an interval between the ending of the third period and the starting of the fourth period are described. The instruction decoder outputs the first control signal in accordance with the field for designating operation in the second operation instruction; controls the instruction execution unit to judge whether or not the predetermined condition is satisfied in the fourth period in accordance with the field for designating amount of delay in the second operation instruction; and controls the instruction execution unit to determine whether or not the predetermined condition is satisfied in accordance with the field for designating condition in the second operation instruction.

According to a second aspect of the present invention, there is provided a data processing device comprising an instruction decoder for decoding a conditional operation instruction and outputting a first control signal and an instruction execution unit for executing an operation in accordance with the first control signal. The instruction execution unit includes a first register for holding the first control signal, a second register for holding a first description representing a condition of executing an operation designated by the conditional operation instruction and a third register for holding a second description representing a time for starting a judgement of the condition. The instruction execution unit starts to judge whether or not the condition is satisfied based on the first description held in the second register in response to an event that the time for starting the judgement of the condition is detected based on the second description held in the third register, and starts to execute the operation designated by the operation instruction after reading out the first control signal held in the first register in response to a result of the judgement.

The second description held in the third register can be set variably.

The data processing device has a program counter for successively counting addresses respectively corresponding to a plurality of operation instructions and holding the addresses. The third register holds a value of address as the second description; the instruction execution unit detects an event that the value of address held in the third register is in agreement with the address in the program counter; and starts a judgement of whether or not the condition is satisfied in response to the detection.

The conditional operation instruction includes a field for designating operation which designates a content of operation, a field for designating condition which designates an execution condition of the operation, and a field for designating amount of delay which designates a time for judging the execution condition. The instruction decoder produces the first control signal based on a content described in the field for designating operation and outputs a content described in the field for designating condition as the first description and outputs a content described in the field for designating amount of delay. The first description outputted from the instruction decoder is held in the second register. The instruction execution unit writes the second description in the third register in accordance with the field for designating amount of delay outputted from the instruction decoder.

The instruction execution unit further includes a fourth register for holding a third description representing a time for starting an operation designated by the operation instruction. The instruction execution unit detects the time for starting the operation designated by the operation instruction in accordance with the third description; judges whether or not the condition is satisfied in response to a result of the detection; and starts to execute the operation designated by the operation instruction in response to the result of judgement.

The data processing device has a program counter or successively counting addresses respectively corresponding to a plurality of instructions and holding the same. A value of address is held in the third register as the second description. A value of address different from the second description is held in a fourth register. The instruction execution unit detects an event that the value of address held in the third register is in agreement with the address in the program counter; and starts a judgement of whether or not the condition is satisfied in response to the detection. Further, the instruction execution unit detects an event that the value of address held in the fourth register is in agreement with the address in the program counter; and starts to execute an operation designated by the operation instruction in response to the detection.

The coded conditional operation instruction includes a field for designating operation which designates a content of operation, a field for designating condition which designates an execution condition of the operation, a first field for designating amount of delay which designates a time for judging the execution condition and a second field for designating amount of delay which designates a time for starting execution of the operation. The instruction decoder produces the first control signal based on a content described in the field for designating operation; outputs a content described in the field for designating condition as the first description; and outputs contents described in the first field for designating amount of delay and the second field for designating amount of delay. The instruction execution unit writes the second description in the third register in accordance with the content described in the first field for designating amount of delay outputted from the instruction decoder and writes the third description in the fourth register in accordance with the content described in the second field for designating amount of delay outputted from the instruction decoder.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is a chart for showing a detailed contents of PSW;

FIG. 7 is a chart for showing a basic format of delayed branch sub-instruction;

FIG. 8 shows an example of program which is processed in the microprocessor shown in FIG. 1 for explanation;

FIG. 9 is a chart for schematically showing a pipeline operation of the microprocessor at a time of processing the program shown in FIG. 8;

FIG. 10 shows an example of another program processed in the microprocessor shown in FIG. 1;

FIG. 11 is a chart for schematically showing a pipeline operation in the microprocessor at a time of processing the program shown in FIG. 9.

DETAILED DESCRIPTION OF THE PREFERRED EMBODIMENTS

A detailed explanation will be given of preferred embodiment of the present invention in reference to FIGS. 1 through 12 as follows, wherein the same numerical references are used for the same or the similar portions and description of these portions is omitted.

Embodiment 1

Figure 1:
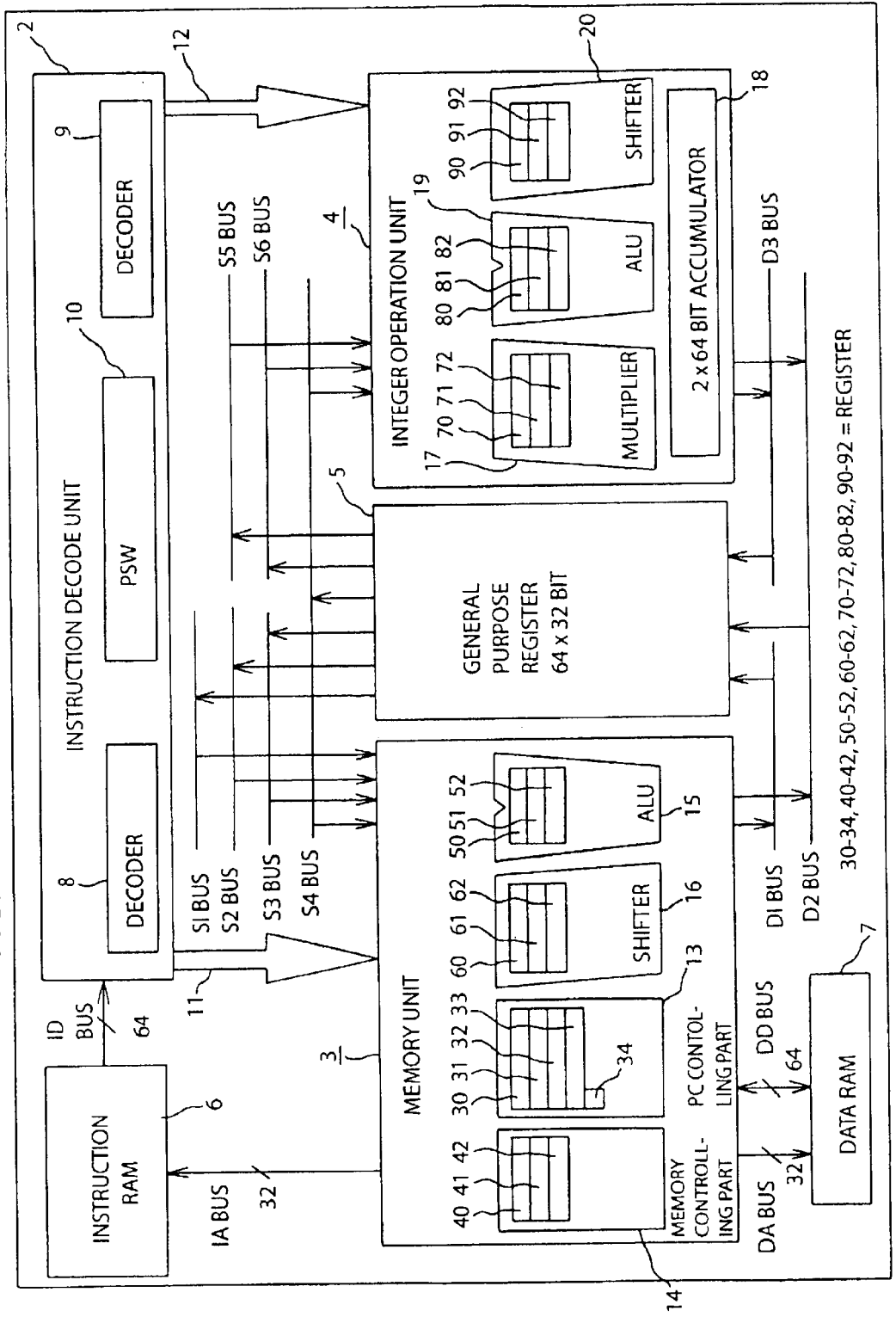
FIG. 1 is a block chart for showing a constitution of a microprocessor according to Embodiment 1 of the present invention.

FIG. 1 is a block chart for showing a constitution of a microprocessor according to Embodiment 1 of the present invention. This microprocessor is a 32-bit microprocessor having an internal data bus of 32 bits. In this Figure, reference numeral 2 designates an instruction decode unit (instruction decoder) for performing a process of decoding an instruction code inputted from an instruction RAM 6 through an ID bus having a width of 64 bits; reference numeral 3 designates a memory unit (instruction execution unit) for performing an address calculation; reference numeral 4 designates an integer operation unit (instruction execution unit) for performing an arithmetic logic operation and/or a shift operation; reference numeral 5 designates a general purpose register of 32 bits×64 words; and reference numeral 7 designates a data RAM for storing data.

In the instruction decode unit 2, reference numerals 8 and 9 respectively designate decoders which decode an instruction code; and reference numeral 10 designates a processor status word (hereinbelow, referred to as PSW) which represents a status of the processor. The instruction decode unit 2 makes a control signal 11 based on a result of decoding in the decoder 8 and a content of PSW 10, and transfers the control signal 11 to the memory unit 3. On the other hand, the instruction decode unit 2 makes a control signal 12 based on a result of decoding in the decoder 9 and a content of PSW 10, and transfers the control signal 12 to the integer operation unit 4.

In the memory unit 3, reference numeral 13 designates a PC controlling part which calculates a program counter value (PC value) with respect to an instruction to be executed subsequently by adding 8 to the PC value when a sub-instruction excluding jump and branch is executed; adds a branch displacement to the PC value when a sub-instruction including jump and/or branch is executed; and calculates the PC value with respect to an instruction existing in a destination of jump by calculating in consideration of an addressing mode designated by an operation. Also, the PC controlling part 13 transfers the calculated PC value to the instruction RAM 6 through an IA bus having a width of 32 bits so that an instruction code is outputted from the instruction RAM 6. Reference numeral 14 designates a memory controlling part for controlling accesses to data which are to be an operand. The memory controlling part 14 transfers address data to the data RAM 7 through a DA bus having a width of 32 bits and accesses to data necessary for instruction execution through a DD bus having a width of 64 bits. Reference numeral 15 designates an ALU which performs an arithmetic logic operation using data having maximum three words transferred from the general purpose register 5 through a S1 bus, S2 bus, and S3 bus each having a width of 32 bits and transfers a result of operation to the general purpose register 5 through the D1 bus having a width of 32 bits; and reference numeral 16 designates a shifter which performs a shift operation using data transferred from the general purpose register 5 through the S1 bus, S2 bus and S3 bus and transfers a result of operation to the general purpose register 5 through the D1 bus.

It is possible to transfer data having a length of 32 bits as much as 4 words simultaneously to the memory unit 3 through the S1 bus, the S2 bus, the S3 bus and an S4 bus. Accordingly, it is possible to realize a two-word store sub-instruction which, for example, stores a memory area addressed by the sum of a content of first register and a content of second register with a content of third register and simultaneously stores a memory area addressed by a value obtained by adding a predetermined value to an address storing the content of third register with a content of fourth register. Also, it is possible to transfer a result of two words obtained by an operation in the memory unit 3 or two-word data transferred from the data RAM 7 to the general purpose register 5 through the D1 bus and the D2 bus.

The PC controlling part 13 includes registers 30, 31, 32, and 33 and a memory circuit 34 for holding one bit. The memory controlling part 14 includes registers 40, 41, and 42. The ALU 15 includes registers 50, 51 and 52. The shifter 16 includes registers 60, 61, and 62. These registers will be described in the below.

In the integer operation unit 4, reference numeral 17 designates a multiplier which performs a multiplication using data having maximum three words transferred from the general purpose register 5 through S4 bus, S5 bus, and S6 bus each having a width of 32 bits and transfers a result of the operation to the general purpose register 5 through D2 bus and D3 bus each having a width of 32 bits; and reference numeral 18 designates an accumulator which holds by cumulatively adding or cumulatively subtracting the result of multiplication. As for the accumulator, there are provided a pair of 64-bit accumulators. Reference numeral 19 designates an ALU which performs an arithmetic logic operation using data having maximum three words transferred from the general purpose register 5 through S4 bus, S5 bus and S6 bus and transfers a result of the operation to the general purpose register 5 through D2 bus and D3 bus; and reference numeral 20 designates a shifter which performs a shift operation using data transferred from the general purpose register 5 through S4 bus, S5 bus and S6 bus and transfers a result of the operation to the general purpose register 5 through D2 bus and D3 bus.

The multiplier 17 includes registers 70, 71, and 72. The ALU 19 includes registers 80, 81, and 82. The shifter 20 includes registers 90, 91, and 92. These registers will also be described in the below.

This microprocessor can read out register values of maximum 6 kinds from the general purpose register 5, wherein the read-out data are outputted respectively to S1 bus, S2 bus, S3 bus, S4 bus, S5 bus, and S6 bus. Also, register values of maximum three kinds can be written in the general purpose register 5 simultaneously through D1 bus, D2 bus, and D3 bus.

Figure 2A:
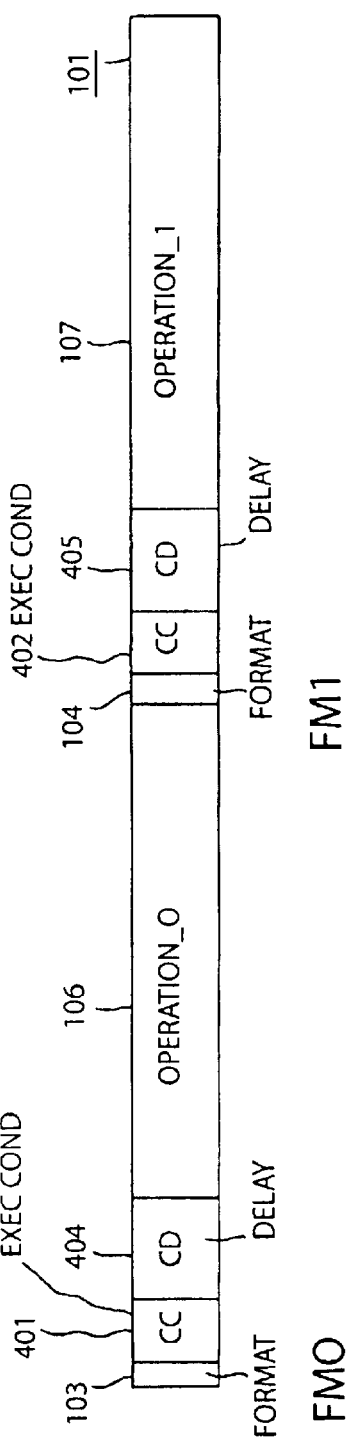
FIG. 2a is a chart for schematically showing an instruction format of the microprocessor.
Figure 2B:
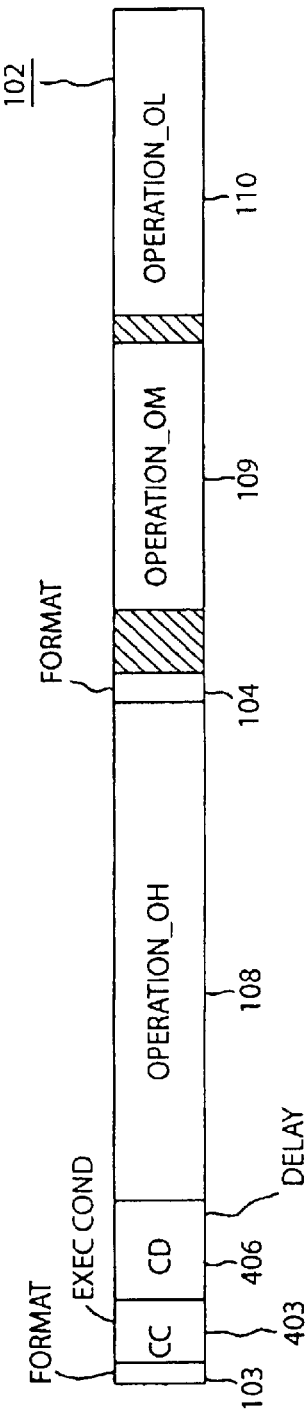
FIG. 2b is a chart for schematically showing an instruction format of the microprocessor.
Figure 3:
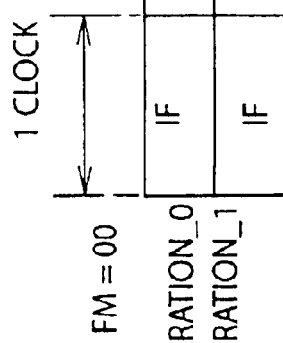
FIG. 3a is a chart for schematically showing a pipeline operation at a time of executing parallel sub-instructions in the microprocessor.
FIG. 3b is a chart for schematically showing a pipeline operation at a time of executing parallel sub-instructions in the microprocessor.
FIG. 3c is a chart for schematically showing a pipeline operation at a time of executing parallel sub-instructions in the microprocessor.
Figure 3:
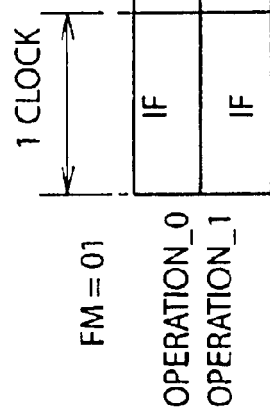
Figure 3:
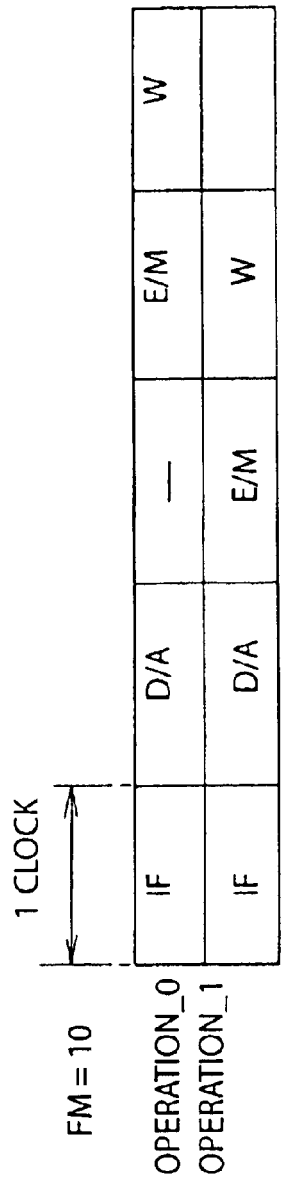

FIGS. 2a and 2b are views for explaining instruction formats of the microprocessor 1. In the instruction formats, there are included a format 101 of dual operation instruction which designates two operations by one instruction word as shown in FIG. 2a and a format 102 of single operation instruction which designates one operation by one instruction word as shown in FIG. 2b.

In the format 101 of dual operation instruction, there is included a format field composed of a field 103 and a field 104, two operation fields 106 and 107, execution condition fields 401 and 402 respectively attached to the operation fields 106 and 107, and fields for designating amount of delay for judging condition (hereinbelow, referred to as CD field) 404 and 405 respectively attached to the execution condition fields 401 and 402.

The format 102 of single instruction operation 102 includes a format field composed of fields 103 and 104, an operation field composed of fields 108, 109, and 110, an execution condition field 403 attached to the operation field and a CD field 406 attached to the execution condition field 403.

The format fields have the following meanings.

|  | Order of execution | |
|---|---|---|
| Code: format | operation_0 | operation_1 |
| FM= 00:2 sub-instructions | first | first |
| 01:2 sub-instructions | first | second |
| 10:2 sub-instructions | second | first |
| 11:1 one sub-instruction | first | — |

In this, reference FM has a value of 2 bits composed of the field 103 and the field 104.

A plurality of pipeline stages in the microprocessor 1 are formed of an instruction fetch stage IF, an instruction decode stage D/A, an instruction execution stage E/M and a write back stage W, wherein processings in each stage are finished within one cock cycle. FIG. 3a through 3c are schematic views for explaining the pipeline stages for processing the dual operation instruction 101 in the microprocessor 1. In the instruction fetch unit IF, the dual operation instruction 101 is fetched from a memory RAM 6 to an instruction decode unit 2. In the instruction decode stage D/A, operation_0 described in the operation field 106 is decoded by the decoder 8 and operation_1 described in the operation field 107 is decoded by the decoder 9. Further, addresses of each operand of operation_0 and operation_1 or, in a case that operation 0 and operation_1 are branch sub-instructions, addresses of destination of branch are calculated in the instruction decode stage D/A. In the instruction execution stage E/M, an operation designated by operation_0 in accordance with a control signal 11 is executed in the memory unit 3, and an operation designated by operation_1 in accordance with a control signal 12 is executed in the integer operation unit 4. When operation_1 is a sub-instruction accompanying memory access such as a load sub-instruction and a store sub-instruction, the memory unit 3 accesses to the memory in the instruction execution stage E/M. In the write back stage W, a result of operation obtained in the memory unit 3 and a result of operation obtained in the integer operation unit 4 are written in registers designated by operation_0 and operation_1 respectively. In a sub-instruction which does not accompany a sub-instruction of writing a result of operation in a register of the processor 1, namely, a branch sub-instruction, a jump sub-instruction, a store sub-instruction storing a memory with data, a comparison sub-instruction reflecting a result of operation in a flag and so on, a write back stage W is not included. Depending on a microprocessor, a write back stage W is processed in the same clock cycle as that of an instruction execution stage E/M.

In the case of FM=00, the stages IF, D/A, E/M, and W respectively of operation_0 and operation_13 1 are performed in parallel, and operation_0 and operation_1 are processed in 4 clocks, as shown in FIG. 3a.

In the case of FM=01, the stages IF, D/A, E/M and W of operation_0 are continuously performed in 4 clocks, as shown in FIG. 3b. The stages IF and D/A respectively of operation_0 and operation_1 are performed in parallel. Meanwhile, the stages E/M and W of operation_1 are performed with a delay of 1 clock from those of operation_0. The stage E/M of operation_1 is performed in parallel with the stage W of operation_0. Accordingly, operation_1 is processed in 5 clocks. In the case of FM=01, the stages IF, D/A, E/M and W are continuously performed in 4 clocks, as shown in FIG. 3c. The stages IF and D/A respectively of operation_0 and operation_1 are performed in parallel. Meanwhile, the stages E/M and W of operation_0 are performed with a delay of 1 clock from those of operation_1. The stage E/M of operation_0 is performed in parallel with the stage W of operation_1. Accordingly, operation_1 is processed in 5 clocks.

Also, a single operation instruction 102 having a format shown in FIG. 2b is also processed in 1 clock cycle in each of the instruction fetch stage IF, the instruction decode stage D/A, the instruction execution stage E/M and the write back stage W. In the stage IF, the single operation instruction 102 is fetched from the instruction RAM 6 to the instruction decode unit 2. In the stage D/A, the single operation instruction 102 is inputted respectively in the decoders 8 and 9. In response to a type of operation designated by the single operation instruction 102, one of the decoders 8 and 9 decodes the single operation instruction 102. When the decoder 8 decodes, it outputs a control signal 11, and when the decoder 9 decodes, it outputs a control signal 12. In the stage E/M, the memory unit 3 (or the integer operation unit 4) executes the operation designated by the single operation instruction 102 in accordance with the control signal 11 (or the control signal 12). In the stage W, a result of operation obtained in the stage E/M is written in a register designated by the single operation instruction 102.

In the next, codes of execution condition will be described. Every execution condition fields 401, 402, and 403 has the following meaning.

| Code: Execution condition |
|---|
| CC=000: always |
| 001: F0=true and F1=don't care |
| 010: F0=false and F1=don't care |
| 011: F0=don't care and F1=true |
| 100: F0=don't care and F1=false |
| 101: F0=true and F1=true |
| 110: F0=true and F1=false |
| 111: reserved |

Each of the execution condition fields 401, 402, and 403 is provided to designate an execute condition of operation sub-instruction attached thereto for determining whether operations of operation_0 and operation_1 in the operation fields 106 and 107 and operations in the operation field composed of the fields 108, 109, and 110 are valid or invalid according to execution control flags F0 and F1. The execution control flags F0 and F1 exist in a processor status word (PSW) 10 as described in the below. When the operation is valid, a result of the operation is reflected in a register, a memory and a flag and a result of an operation obtained by the operation is left. On the other hand, when the operation is invalid, the operation designated by decoding the operation sub-instruction is not executed or a result of the operation is not reflected on a register, a memory, nor a flag even though the operation is executed, namely the no result of operation is left as if an invalid operation (NOP) is executed.

When a value of execution condition field CC is 000, an operation is always valid despite values of execution control flags F0 and F1. When CC=001, an operation is valid only in a case that the execution control flag F0 is true. It doesn't care the state of control flag F1. When CC=010, the operation is effective only in a case that the execution control flag F0 is false. It doesn't care the state of execution control flag F0. When CC=011, the operation is effective only in a case that the execution control flag F1 is true. It doesn't care the state of execution control flag F0. When CC=100, the operation is valid only in a case that the execution control flag F1 is false. It doesn't care the state of execution control flag F0. When CC=101, the operation is valid only in a case that the execution control flag F0 is true and simultaneously the execution control flag F1 is true. When CC=110, the operation is valid in a case that the execution control flag F0 is true and the execution control flag F1 is false. When CC=111, the process is undefined and a user can not use an instruction defined by CC=111.

Figure 4:
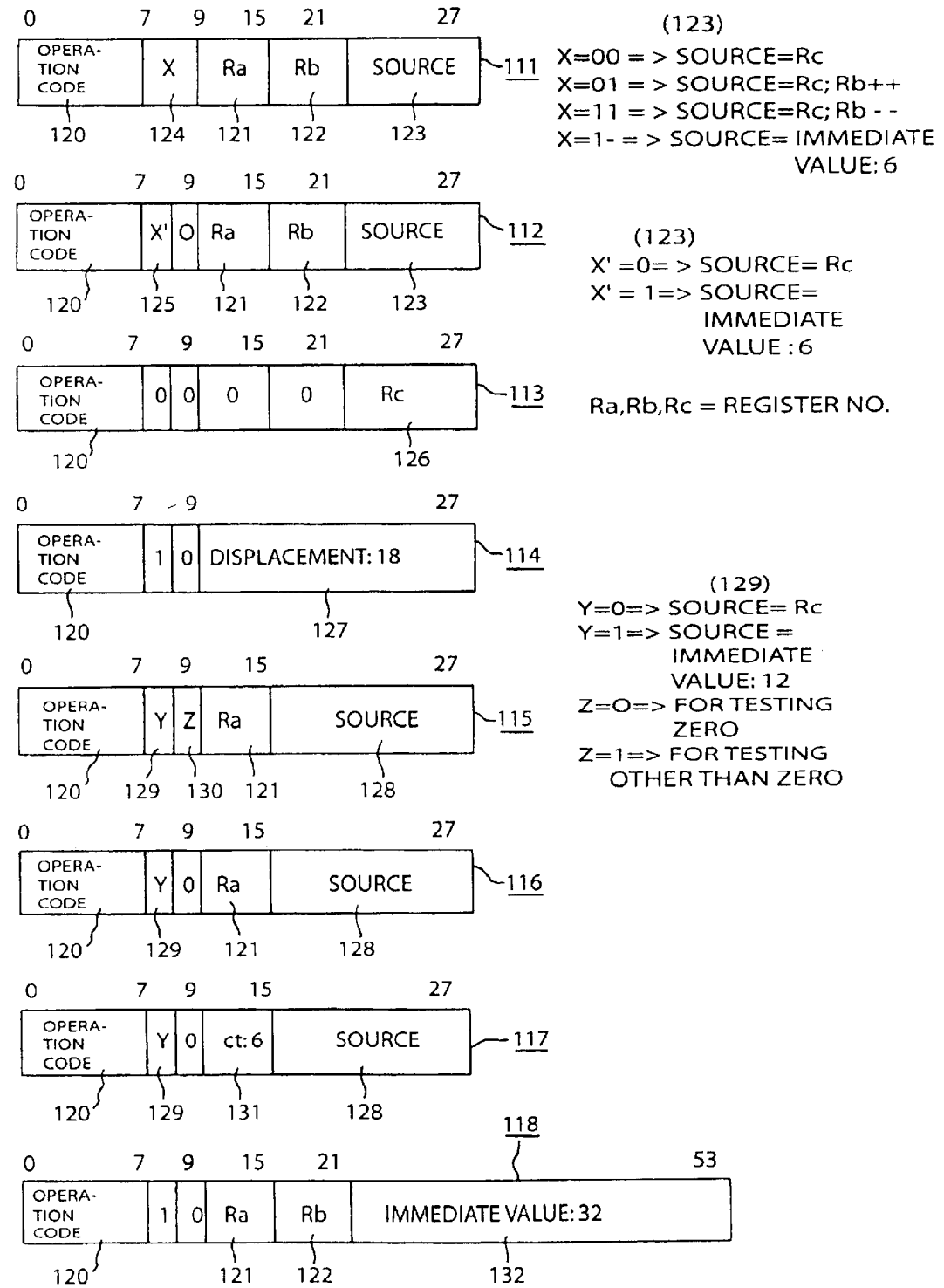
FIG. 4 is a chart for showing detailed contents of operation fields.
Figure 5:
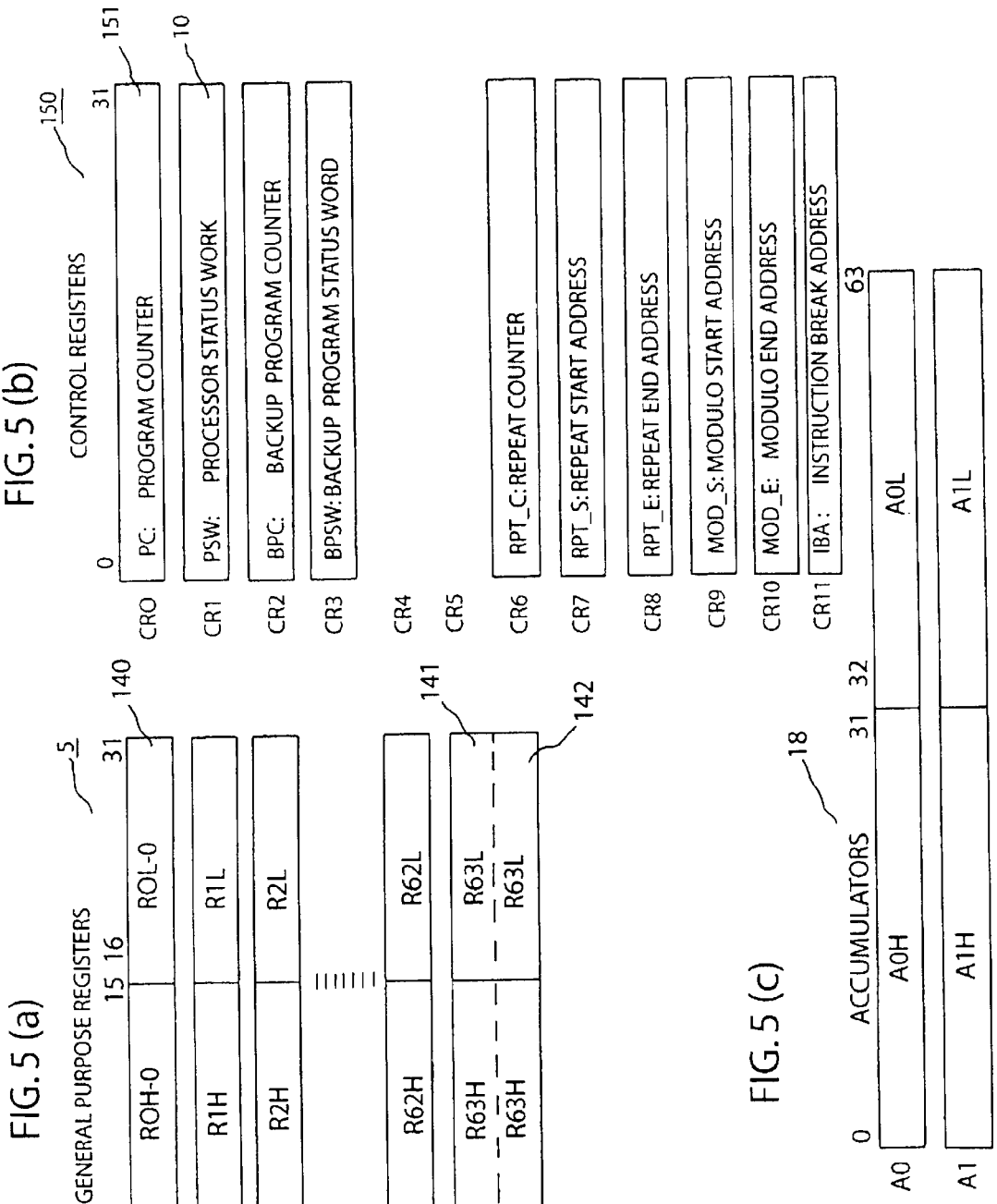
FIG. 5a is a chart for showing a constitution of register of the microprocessor.
FIG. 5b is a chart for showing a constitution of register of the microprocessor.
FIG. 5c is a chart for showing a constitution of register of the microprocessor.

FIG. 4 is a diagram for showing detailed contents of operation fields. Formats 111 through 117 are used for a short-type operation field 106 and a short-type operation field 107 both expressed by 28 bits. Format 118 is used for a long-type operation field composed of fields 108, 109 and 110.

The format 111 (Short_M) is composed of a field 120 for designating a content of operation, two fields 121 and 122 for designating register numbers, a field 123 for designating a register number of an immediate value having a length of 6 bits and a field 124 for designating whether the field 123 designates a register number or an immediate value. As shown in FIGS. 3a through 3c, when a value X in the field 124 is "00", "01" or "11", it means that the field 123 designates a register number. When the value X of field 124 is "10", it means that the field 123 designates an immediate value.

This format 111 is used for a memory access operation when a register indirect addressing is conducted.

The format 112 (Short_A) is composed of a field 120 for designating a content of operation, two fields 121 and 122 for designating register numbers, a field 123 for designating a register number or an immediate value having a length of 6 bits and a field 125 for designating whether the field 123 designates the register number or the immediate value. As shown in FIGS. 3a through 3c, when a value X' of field 125 is "0", it means that the field 123 designates the register number. When the value X' of field 125 is "1", it means that the field 123 designates the immediate value.

This format 112 is used for an arithmetic operation, a logical operation, a shift operation and a bit operation.

The format 113 (Short_B1) is composed of a field 120 for designating a content of operation and a field 126 for designating a register number. This format 113 is used for a jump instruction and a branch instruction based on a designation of register.

The format 114 (Short_B2) is composed of a field 120 for designating a content of operation and a field 127 having a displacement of 18-bit length. This format 114 is used for a jump instruction or a branch instruction.

Format 115 (Short_B3) is composed of a field 120 for designating a content of operation, a field 121 for designating a register number, a field 128 for designating a register number or an immediate value having a length of 12 bits, a field 129 for designating whether the field 128 designates the register number or the immediate value and a field 130 for designating whether or not a conditional jump or a conditional branch is executed based on the field 121 upon judgement of 0.

This format 115 is used for a conditional jump instruction or a conditional branch instruction.

Format 116 (Short_D1) is composed of a field 120 for designating a content of operation, a field 121 for designating a register number, a field 128 for designating a register number or an immediate value having a length of 12 bits and a field 129 for designating whether or not the field 128 designates the register number or the immediate value.

This format 116 is used for a conditional jump instruction, a conditional branch instruction and a repeat instruction.

The format 117 (Short_D2) is composed of a field 120 for designating a content of operation, a field 128 for designating a register number or an immediate value having a length of 12 bits, a field 129 for designating whether the field 128 designates the register number or the immediate value and a field 131 relating to a delayed instruction.

This format 117 is used for a delayed jump instruction, a delayed branch instruction, and a repeat instruction.

The format 118 (Long) is composed of a field 120 for designating a content of operation, two fields 121 and 122 for designating register numbers and a field 132 for designating an immediate value having a length of 32 bits.

This format 118 is used for a complicated arithmetic operation, an arithmetic operation using a large immediate value, a memory access operation in register indirect addressing with a large displacement, a branch operation accompanying a large displacement, a jump instruction to an absolute address, and so on.

FIGS. 5a through 5c are diagrams for explaining a register configuration of a microprocessor.

This microprocessor has general purpose registers 5 having a length of 32 bits as many as a number of 64 as shown in FIG. 5a, control registers 150 as many as a number of 12 as shown in FIG. 5b and accumulators 18 as many as a number of 2 as shown in FIG. 5c. A content 140 in a general purpose register R0 is always 0 and a writing thereto is ignored. General purpose register R62 is a link register in which a return address from a subroutine is set. The general purpose register R63 is a stack pointer, which works as a user stack pointer (SPU) or an interrupt stack pointer (SPI) in response to a value of SM field in PSW10. In the control registers 150, a program counter 151, PSW10 and various registers for dedicated use are included.

In an operation by the format 112 shown in FIG. 4, each of upper 16 bits and lower 16 bits of the 64 general purpose registers 5 can be separately accessed. Also, each of upper 32 bits and lower 32 bits of the two accumulators 18 can be separately accessed.

FIG. 6 is a diagram for showing a detailed content of PSW10.

Upper 16 bits of PSW10 include a SM field 171 for switching a stack pointer, an EA field for indicating detection of a self debug trap (SDBT), a DB field 173 for designating admission of SDBT, an IE field 174 for designating interrupt permission, an RP field 175 for designating permission of repeat operation and an MD field 176 for designating permission of a modulo addressing. Lower 16 bits are a flag field 180. The flag field 180 includes eight flags, wherein an F0 flag 181 and an F1 flag 182 designate validness/invalidness of operation. A value of each flag changes depending on a result of comparison operation or a result of arithmetic operation. Further, it changes by initializing by an operation of initializing flag or by writing an arbitrary value in the flag field 180 using an operation of writing flag value. A content of the flag field 180 can be read out by an operation of reading flag value.

Each field has the following meaning.

| | |
|---|---|
| SM=0: | stack mode 0 → use SPI |
| SM=1: | stack mode 1 → use SPU |
| EA=0: | SDBT is not detected |
| EA=1: | SDBT is detected |
| DB=0: | SDBT is not enabled |
| DB=1: | SDBT is enabled |
| IE=0: | interrupt is not enabled |
| IE=1: | interrupt is enabled |
| RP=0: | repeat block is invalid |
| RP=1: | repeat block is valid |
| MD=0: | modulo addressing is invalid |
| MD=1: | modulo addressing is valid |
| F0: | general purpose flag (execution control flag) |
| F1: | general purpose flag (execution control flag) |
| F2: | general purpose flag |
| F3: | general purpose flag |
| F4 (S): | saturated operation flag |
| F5 (V): | overflow flag |
| F6 (VA): | cumulative overflow flag |
| F7 (C): | carry/borrow flag |

Hereinbelow, a sub-instruction list of this microprocessor is shown.

A. Sub-instructions concerning function of microprocessor

A-1. Load/store sub-instruction

| | |
|---|---|
| LDB: | Load one byte to a register with sign extension |
| LDBU: | Load one byte to a register with zero extension |
| LDH: | Load one half-word to a register with sign extension |
| LDHH: | Load one half-word to a register high |
| LDHU: | Load one half-word to a register with zero extension |
| LDW: | Load one word to a register |
| LD2W: | Load two words to registers |
| LD4BH: | Load four bytes to four half-words in two registers with sign extension |
| LD4BHU: | Load four bytes to four half-words in two registers with zero extension |
| LD2H: | Load two half-words to two words in two registers with sign extension |
| STB: | Store one byte from a register |
| STH: | Store one half-word from a register |
| STHH: | Store one half-word from a register high |
| STW: | Store one word from a register |
| ST2W: | Store two words from registers |
| ST4TB: | Store four bytes from four half-words from two registers |
| ST2H: | Store two half-words from two registers |
| MODDEC: | Decrement a register value by a 5-bits immediate value |
| MODINC: | Increment a register value by a 5-bits immediate value |

A-2. Transfer sub-instruction

| | |
|---|---|
| MVFSYS: | Move data from a control register to a general purpose register |
| MVTSYS: | Move data from a general purpose register to a control register |
| MVFACC: | Move data from an accumulator to two general purpose registers |
| MVTACC: | Move data from two general purpose registers to an accumulator |

A-3. Comparison instruction

| | |
|---|---|
| CMPcc: | Compare<br>cc=EQ (equal), NE(not equal), GT(greater than),<br>GE(greater than or equal to), LT(less than),<br>LE(less than or equal to), PS(both are plus),<br>NG(both are minus) |
| CMPUcc: | Compare unsigned<br>cc=GT, GE, LT, LE |

A-4. Maximum value/minimum value sub-instruction
reserved

A-5. Arithmetic operation sub-instruction

| | |
|---|---|
| ABS: | Absolute |
| ADD: | Add |
| ADDC: | Add with carry |
| ADDHppp: | Add half-word<br>ppp=LLL (lower of register, lower of register, lower of register), LLH, (lower of register, lower of register, upper of register), LHL, LHH, HLL, HLH, HHL, HHH |
| ADDS: | Add register Rb with the sign of the third operand |
| ADDS2H: | Add sign to two half-words |
| ADD2H: | Add two pairs of half-words |
| AVG: | Average with rounding towards positive infinity |
| ADG2H: | Average two pairs of half-words respectively rounding towards positive infinity |
| JOINpp: | Join two half-words<br>pp=LL, LH, HL, HH |
| SUB: | Subtract |
| SUBB: | Subtract with borrow |
| SUBHppp: | Subtract half-word<br>ppp=LLL, LLH, LHL, LHH, HLL, HLH, HHL, HHH |
| SUB2H: | Subtract two pairs of half-words |

A-6. Logical operation sub-instruction

| | |
|---|---|
| AND: | logical AND |
| OR: | logical OR |
| NOT: | logical NOT |
| XOR: | logical exclusive OR |
| ANDFG: | logical AND flags |
| ORFG: | logical OR flags |
| NOTFG: | logical NOT a flag |
| XORFG: | logical exclusive OR flags |

A-7. Shift operation sub-instruction

| | |
|---|---|
| SRA: | Shift right arithmetic |
| SRA2H: | Shift right arithmetic two half-words |
| SRC: | Shift right concatenated registers |
| SRL: | Shift right logical |
| SRL2H: | Shift right logical two half-words |
| ROT: | Rotate right |
| ROT2H: | Rotate right two half-words |

A-8. Bit operation sub-instruction

| | |
|---|---|
| BCLR: | Clear a bit |
| BNOT: | Invert a bit |
| BSET: | Set a bit |
| BTST: | Test a bit |

A-9. Branch sub-instruction

| | |
|---|---|
| BRA: | Branch |
| BRATZR: | Branch if zero |
| BRATNZ: | Branch if not zero |
| BSR: | Branch to subroutine |
| BSRTZR: | Branch to subroutine if zero |
| BSRTNZ: | Branch to subroutine if not zero |
| JMP: | Unconditional jump |
| JMPTZR: | Jump if zero |
| JMPTNZ: | Jump if not zero |
| JSR: | Jump to subroutine |
| JSRTZR: | Jump to subroutine if zero |
| JSRTNR: | Jump to subroutine if not zero |
| NOP: | No operation |

Delayed branch, jump sub-instruction

| | |
|---|---|
| DBRA: | Delayed branch |
| DBRAI: | Delayed branch immediate (immediate value) |
| DBSR: | Delayed branch to subroutine |

-continued

| | |
|---|---|
| DBSRI: | Delayed branch immediate to subroutine (immediate value) |
| DJMP: | Delayed jump |
| DJMPI: | Delayed jump immediate (immediate value) |
| DJSR: | Delayed jump to subroutine |
| DJSRI: | Delayed jump immediate to subroutine (immediate value) |
| A-10. Sub-instruction concerning OS | |
| TRAP: | Trap |
| REIT: | Return from exception, interrupts, and traps |

| B. Sub instruction concerning DSP function | |
|---|---|
| B-1. Arithmetic operation sub-instruction | |
| MUL: | Multiply |
| MULX: | Multiply with extended precision (double precision) |
| MULXS: | Multiply and shift to the right by one with extended precision (double precision) |
| MULX2H: | Multiply two pairs of half-words with extended precision (double precision) |
| MULHXpp: | Multiply two half-words with extended precision (double precision) pp=LL, LH, HL, HH |
| MUL2H: | Multiply two pairs of half-words |
| MACa: | Multiply and add (operation) a (designating accumulator)=0, 1 |
| MACSa: | Multiply, shift to the right by one and add (operation) a=0, 1 |
| MSUBa: | Multiply and subtract (operation) a=0, 1 |
| MSUBSa: | Multiply, shift to the right by one and subtract (operation) a=0, 1 |
| B-2. Repeat sub-instruction | |
| REPEAT: | Repeat a block of instructions |
| REPEATI: | Repeat a block of instructions immediate (designating immediate value) |

In the next, the CD field in the instruction formats shown in FIGS. 2a and 2b will be described in detail. The CD field 404 is to designate an amount of delay by which timing of judging an execution condition designated by the execution condition field 401 corresponding thereto in a pipeline process of operation_0 designated by the operation field 106 corresponding thereto, wherein the amount of delay can be variably set when a user sets a value of CD field 404 appropriately.

Specifically, in the CD field 404, an offset value OVA from a memory address X of the instruction with the format 101 is described as an immediate value. In this case, timing of judging the execution condition described in the execution condition field 401 in the process of operation_0 is a clock cycle when a PC value of the microprocessor 1 holds the address No. (X+OVA), wherein the offset value OVA can be 0. In such a case, the timing of judging the execution condition is a clock cycle when the PC value holds the address No. X. Further, it is possible to describe a description designating a register number of a register in the processor 1 which holds an address value in the CD field 404. In this case, the timing of judging the execution condition described in the execution condition field 401 is a clock cycle where the PC value of the microprocessor 1 is an address held in the designated register. A bit for distinguishing whether an immediate value is described in the CD field 404 or a register number is described therein exists in the identical CD field 404.

However, when the execution condition field 401 designates the unconditional execution of CC=000, the value of CD field 404 is ignored by the instruction decode unit 2 and the units 3 and 4 at the process of executing operation_0 corresponding thereto.

The CD field 405 works the same as the CD field 404 does with respect to the operation field 107 and the condition execution field 402. Further, the CD field 406 works the same as the CD field 404 does with respect to operations of the fields 108 through 110 and the conditional execution field 403.

Registers in the memory unit 3 shown in FIG. 1 will be described.

The register 30 in the PC controlling part 13, the register 40 in the memory controlling part 14, the register 50 in ALU 15 and the register 60 in the shifter 16 hold a control signal 11 obtained by decoding operation_0 designated by the operation field 106 without change, respectively.

The register 31 in the PC controlling part 13, the register 41 in the memory controlling part 14, the register 51 in ALU 15 and the register 61 in the shifter 16 hold a description designating a condition for executing an operation of operation_0 respectively. In this embodiment, a CC value of the condition execution field 401 in the instruction format 101 is held without change.

The register 32 in the PC controlling part 13, the register 42 in the memory controlling part 14, the register 52 in ALU 15 and the register 62 in the shifter 16 hold a description of a time for judging the execution condition of the operation of operation_0. Specifically, the PC value (address value) at a time for judging the execution condition of the operation of operation_0 is held. For example, an address value which should be held in the register 32 is produced by the PC controlling part 13 based on the CD field 404 having an offset value. The PC controlling part 13 receives the offset value of the CD field 404 from the instruction decode unit 2, adds the offset value to the address of instruction format 101 in which operation_0 is described and sets the added value in the register 32. When the CD format 404 designates a register number, the PC controlling part 13 receives the register number from the instruction decode unit and sets it in the register 32 directly. In the register 32 specified by the register number held in the register 32 holds a PC value (address value) to be used at the time for judging the execution condition of the operation of operation_0. Incidentally, a bit for distinguishing whether a PC value is held in the register 32 or a register number is held therein is provided in the register 32.

The memory controlling part 14, ALU 15 and the shifter 16 produce a PC value or a register number in a similar manner to that in the PC controlling part 13 and set these respectively in the register 42, the register 52 and the register 62.

The PC controlling part 13 works as an operation unit of the instruction execution unit when operation_0 designated by the operation field 106 is a branch sub-instruction as described in the above (A-9). In a case that operation_0 is a branch sub-instruction, the registers 30 through 32 function as described in the above, and other registers 40 through 42, 50 through 52 and 60 through 62 are not used. Also, the memory controlling part 14 works as an operation unit of the instruction execution unit when operation_0 designated by the operation field 106 is a memory access sub-instruction such as a load/store sub-instruction described in the above (A-1). In a case that operation_0 is such a memory access sub-instruction, the registers 40 through 42 function as described in the above, and other registers are not used.

ALU 15 works as an operation unit of the instruction execution unit when operation_0 designated by the operation field 106 is an arithmetic operation sub-instruction as described in the above (A-5) or a logical operation sub-instruction as described in the above (A-6). In a case that operation_0 is an arithmetic operation sub-instruction or a logical operation sub-instruction, the registers 40 through 42 function as described in the above, and other registers are not used.

Further, the shifter 16 works as an operation unit of the instruction execution unit when operation_0 designated by the operation field 106 is a shift operation instruction as described in the above (A-7). In a case that operation_0 is such a shift operation sub-instruction, the registers 40 through 42 function as described in the above, and other registers are not used.

A register 33 and a memory circuit 34 in the PC controlling part 13 are used when operation_0 is specifically a delayed branch sub-instruction and a delayed jump sub-instruction.

FIG. 7 is a diagram for explaining a basic format 320 of delayed branch sub-instruction. Basically, the format 320 of delayed branch sub-instruction includes an operation code 321, a field for designating amount of execution delay 322 which designates an amount of delay by which a time of executing branch is delayed and a field for designating branch destination 323 which designates an offset or an address for designating a branch target address. The delayed branch sub-instruction is realized by, for example, the format 116 (Short_D1), the format 117 (Short_D2) or the format 118 (Long). The format 116 (Short_D1) is used when a register set value is used as the amount of delay. The format 117 (Short_D2) is used when an immediate value is used as the amount of delay. The format 118 (Long) is used when the branch target address is designated by a 32-bit immediate value. In these formats, an operation code is designated by the field 120. Further, the field 129 is used to designate whether the field 128 indicates a register number or an immediate value. The field 121 is used as a region for designating register when an amount of delay is designated by a register in each sub-instruction of DBRA, DBSR, DJMP, and DJSR. The field 131 is used as a region of immediate value designating the amount of delay.

The delayed jump sub-instruction is also described in the format shown in FIG. 7. However, the field 323 designates a register number of register holding an address of jump destination.

In this embodiment, the amount of delay described in the field 131 as an immediate value is an offset value OVB from an address X of dual operation instruction 101 in which a delayed branch sub-instruction or a delayed branch sub-instruction is described. Accordingly, the amount of delay can be variably set when an user appropriately sets a value in the field for designating amount of execution delay 322. However, it is necessary for the user to set the field for designating amount of execution delay 322 or the CD field 404 so that a time for executing the branch is not earlier than a time for judging the branch condition determined by the CD field 404.

The register 33 provided in the PC controlling part 13 holds a description about a time for executing the branch designated by the delayed branch sub-instruction or the delayed jump sub-instruction. Specifically, a PC value (address value) at the time for executing the branch is held. The address value to be held in the register 33 is produced by the PC controlling part 13 based on the field 322 having an offset value. The PC controlling part 13 receives the offset value of field 322 from the instruction decode unit 2, adds the offset value to an address of the instruction format 101 in which a delayed branch sub-instruction or a delayed jump sub-instruction is described and sets the added value to the register 33. When the format 322 designates a register number, the PC controlling part 13 receives the register number from the instruction decode unit and sets it directly to the register 33. The register specified by the register number held in the register 33 holds the PC value at the time of executing the branch.

The memory circuit 34 of the PC controlling part 13 is to hold a description indicating whether or not an execution condition is satisfied as a result of judging the execution condition of the delayed branch sub-instruction or the delayed jump sub-instruction by the PC controlling part 13.

The control signal 11 held in the register 30 includes a description of 1 bit for distinguishing whether a sub-instruction with respect to the control signal 11 is a delayed branch sub-instruction or an ordinary branch sub-instruction without delay.

Further, registers in the integer operation unit 4 shown in FIG. 1 will be described.

Each of the register 70 of the multiplier 17, the register 80 of ALU 19 and the register 90 of the shifter 20 holds the control signal 12 obtained by decoding operation_1 designated by the operation field 106 without change.

Each of the register 71 of the multiplier 17, the register 81 of ALU 19 and the register 91 of the shifter 20 holds a description which designates an execution condition of an operation of operation_1. In this embodiment, a CC value of the condition execution field 402 in the instruction format 101 is held without change.

Each of the register 72 of the multiplier 17, the register 82 of ALU 19 and the register 92 of the shifter 20 holds a description at a time of judging an execution condition of the operation of operation_1. When the CD field 405 has an offset value, it is held as a PC value (address value) to be used at the time of judging the execution condition of the operation of operation_1. The PC value to be held is a value obtained by adding an address of the instruction format 101 in which operation_1 is described to the offset value. Also, when the CD field 405 designates a register number, the register number is held directly. A register specified by the register number which is held in the register 72 holds a PC value (address value) to be used at the time of judging the execution condition of the operation of operation_1. The multiplier 17, ALU 19 and the shifter 20 set a value respectively to the register 72, the register 82 and the register 92 in accordance with the CD field 405 receiving a content from the instruction decode unit.

The multiplier 17 works as an operation unit of the instruction execution unit when operation_1 designated by the operation field 107 is a multiply sub-instruction and a multiply and add sub-instruction, both of which accompany a multiplication as shown in the above (B-1). In a case that operation_1 is a sub-instruction accompanying a multiplication, the registers 70 through 72 function as mentioned in the above, and other registers 80 through 82 and 90 through 92 are not used. ALU 19 works as an operation unit of the instruction execution unit when operation_1 designated by the operation field 107 is an arithmetic operation sub-instruction as in the above (A-5) or a logical operation sub-instruction as in the above (A-6). In the case that operation_1 is an arithmetic operation sub-instruction or a logical operation instruction, the registers 80 through 82 function as mentioned in the above and other registers are not used.

The shifter 20 works as an operation unit of the instruction execution unit when operation_1 designated by the operation field 107 is a shift operation sub-instruction as in the above (A-7). In the case that operation_1 is a shift operation instruction, the registers 40 through 42 function as mentioned in the above, and other registers are not used.

In a case that a single operation instruction is processed by the instruction format 102, one of the PC controlling part 13, the memory controlling part 14, ALU 15, ALU 19, the shifter 16, the shifter 20 and the multiplier 17 executes an operation sub-instruction as an operation unit of the instruction execution unit depending on a type of operation such as a branch, a memory access and an arithmetic operation. The CD field 406 designates an amount of delay by which a time for judging an execution condition designated by the execution condition field 403 similarly in a pipeline process of a single operation instruction. Further, a register provided in the operation unit of the instruction execution unit for executing the single operation instruction 102 holds a value having the same content as described about the single operation instruction 102 in the above.

In the next, operation of the microprocessor 1 will be described in reference of an example of program shown in FIG. 8.

In this program, a pair of sub-instructions in each row is described by a dual operation instruction 101 having the instruction format shown in FIG. 2a, wherein sub-instructions I01, I11, I21, I31, I41, I51, and I61 are described in the operation field 106 as operation_0, and sub-instructions I02, I12, I22, I32, I42, I52, and I62 are described in the operation field 107 as operation_1. Each dual operation instruction is accessed by means of an address number of memory described in the identical row. For example, the sub-instructions I01 and I02 are stored in a memory area of No. 1000 through No. 1007 and accessible at an address No. 1000.

The sub-instruction I01 is a branch instruction BRA for taking a branch to sub-instruction I11 and I12 having a description of "loop" when a branch condition that "flag F0 is false (namely, flag F0 holds 0) is satisfied, wherein the branch condition is judged at the time of executing the sub-instruction I41 and I42. And the branch instruction BRA is an ordinary branch instruction without delay. The sub-instruction I21 is an add instruction ADD which adds a content of a register R2 to a content of a register R3 and stores the result of addition in the register R2. The sub-instruction I31 is a comparison instruction CMPEQ which writes "1" in the flag F0 when the content of register R2 and a content of register R4 are equal and "0" therein when the contents are not equal. The sub-instructions I11, I41, I51, and I61 are arbitrary arithmetic operation instructions by which the stage E/M is processed in the memory unit 2, and other sub-instructions are arbitrary arithmetic operation instructions by which the stage E/M is processed in the integer operation unit 3.

On the execution condition field 401 corresponding to the sub-instruction I01, there is described "CC=010"; and sub-instructions other than the sub-instruction I01 are instructions executed unconditionally, wherein execution condition fields corresponding thereto have a description of "CC=000". Further, in the CD field 404 corresponding to the sub-instruction I01, an offset value '20' is described. Further, dual operation instructions described in the rows are instructions which execute two operations of the sub-instructions in parallel by setting the FM fields 103 and 104 to be 00.

In the program shown in FIG. 8, one loop is formed by the four dual operation instructions in the address Nos. 1008, 1010, 1018, and 1020, wherein this program means that the four dual operation instructions are repeatedly executed in a sequential manner until the flag F0 becomes true when a comparison instruction is executed by the sub-instruction I31.

FIG. 9 shows operation of the microprocessor 1 which processes the program shown in FIG. 8 in pipeline. In the Figure, clocks t1 through t13 designate continuous one clock cycles, and all pipeline stages in each clock cycle are processes in parallel. For example, in clock t5, each stage W in the sub-instructions I11 and I12, each stage E/M in the sub-instructions I21 and I22, each stage D/A in the sub-instructions I31 and I32 and each stage IF in the sub-instructions I41 and dI42 are processed in parallel respectively. Stages in other clock cycles are similarly processes thereto.

In FIG. 9, an address value held by the PC of microprocessor 1 shows that the clock cycle corresponding to the address value is a cycle just after the cycle of processing the dual operation instruction which is accessed by the address value on the instruction decode stage D/A.

Concerning the sub-instructions I01 and I02, the instruction fetch stage IF, and the instruction decode stage D/A are processed in parallel respectively in the clock t1 and the clock t2. Although the instruction execution stage E/M and the write back stage W of the sub-instruction I02 are processed respectively in the clocks t3 and t4, the instruction execution stage E/M of the sub-instruction I01 is not processed by judging the execution condition and branching based on this judgement, until it is enabled to process.

The instruction decode unit 2 detects that the sub-instruction I01 is a sub-instruction for delaying judgement of execution condition in accordance with the field for designating condition 401 and the CD field 404 both of which are of the branch sub-instruction BRA as the sub-instruction I01, and the contents of the field for designating condition and the CD field are outputted to the PC controlling part as a control signal for judging the execution condition with a delay. Also, the field for designating operation is decoded in the decoder 8 and a control signal 11 is outputted in response to the result of decoding. In the control signal 11, a first description for controlling the PC controlling part 13 so as to take a branch of the branch sub-instruction BRA, a second description for showing that the sub-instruction I01 is an ordinary sub-instruction which does not cause a delay of execution, a third description for indicating a branch address of the branch sub-instruction BRA are included. The third description is the branch address itself, which is calculated by an adder for exclusively calculating address (not shown) based on an offset designated by the field 323 of the branch sub-instruction BRA at the instruction decode stage E/A.

In the clock t3, the PC controlling part 13 receives a description that the sub-instruction I01 from the instruction decode unit 2 is a conditional sub-instruction and a sub-instruction for delaying a time of judging the condition, and holds the control signal 11 with respect to the branch sub-instruction BRA in its register 30 without change. At this time, the branch is not executed based on the control signal 11. A value of CC=010 which is the execution condition field outputted from the instruction decode unit 2 is held in the register 31 without change. Further, the PC controlling part 13 receives an offset value "20" which is the CD field from the instruction decode unit 2 and the address No. 1000 from the PC, adds these, and holds a result of the addition of the address No. 1020 in its register 32 at the clock t3. The PC controlling part 13 is comparing the value held in the register 32 with the value indicated by the PC.

The PC controlling part 13 judges the execution condition of the branch sub-instruction BRA based on a clock cycle at which the address value in the PC is equal to the address value in the register 32, namely, a CC value held in the register 31 at the clock t7.

On the other hand, the decoder 9 of the instruction decode unit 2 analyzes the field for designating operation 107 to thereby output a control signal 12 for commanding ALU 18 to perform an arithmetic operation, with respect to the sub-instruction I02. The instruction decode unit 2 detects, based on the field for designating condition, that the sub-instruction I02 is an unconditional sub-instruction, and outputs a description of showing that the sub-instruction I02 is unconditional (CC=000).

ALU 18 performs an add operation in accordance with a control signal 12 without holding the control signal 12 in its register 80 when the description that it is unconditional is received. Further, the value of execution condition field 402 and the value of CD field 405 both in the sub-instruction 101 are outputted from the instruction decode unit 2. However, ALU 18 holds values already held in the registers 81 and 82 without change by ignoring the value of execution condition field 402 and the value of CD field 405. As for other sub-instructions to be executed unconditionally described in the below, the similar processes thereto are applicable.

With respect to the sub-instructions I11 and I12, the instruction fetch stages IF, the instruction decode stages D/A, the instruction execution stages E/M and the write back stage W are processed in parallel respectively at the clocks t2, t3, t4, and t5.

With respect to the sub-instructions I21 and I22, the instruction fetch stages IF, the instruction decode stages D/A, the instruction execution stages E/M and the write back stages W are processed in parallel respectively at the clocks t3, t4, t5, and t6. On the add sub-instruction ADD which is the sub-instruction I21, a content of the register R5 and a content of the register R6 are operated to add in the stage E/M of the clock t5 by ALU 15 and a result of the addition is written in the register R5 in the stage W of the clock t6.

With respect to the sub-instructions I31 and I32, the instruction fetch stages IF, the instruction decode stages D/A and the instruction execution stages E/M are processed in parallel respectively at the clocks t4, t5, and t6. On the comparison sub-instruction CMPEQ which is the sub-instruction I31, a content of the register R2 and a content of the register R4 are compared by ALU 15 in the stage E/M of the clock t6, wherein if the contents are equal '1' is written in the flag F0 and if not, '0' is written in the flag F0. Although the execution stage E/M of the comparison sub-instruction CMPEQ can not basically be started before the clock t6 at which a result of operation by the add sub-instruction ADD is written in the register R5, it is processed using a result of the operation by the add sub-instruction which is obtained at the clock t5 by a bypass circuit provided in the processor 1.

Incidentally, in the case of the comparison sub-instruction CMPEQ, the write back stage W is not included. On the other hand, the write back stage W of the sub-instruction I32 is processed at the clock t7.

With respect to the sub-instructions I41 and I42, the instruction fetch stages IF, the instruction decode stages D/A, the instruction execution stages E/M and the write back stages W are processed in parallel respectively at the clocks t5, t6, t7, and t8.

The branch condition of the branch sub-instruction BRA is judged at the clock t7 because a result of operation by the sub-instruction I31 should be referred to. At the clock t7, the PC controlling part 13 refers to the flag F0 in accordance with the value of '010' held in the register 31, determines to take a branch when the flag F0 is '0', and determines not to take a branch when the flag F0 is '1'.

The PC controlling part 13 ignores a content of the register 33 in accordance with an event that the second description of the control signal 11 held in the register 30 shows that the branch sub-instruction BRA is a branch sub-instruction without delay. In other words, the instruction execution stage E/M is processed at the same clock t7 in accordance with an event that the branch condition is determined in the PC controlling part 13. Since the sub-instruction I41 is an arithmetic operation sub-instruction and the instruction execution stage E/M therefore is processed in ALU 15 not in the PC controlling part 13, the stages E/M of the sub-instruction I01 and the sub-instruction I41 can be processed in parallel. In the operation of microprocessor 1 shown in FIG. 9, provided that '0' is written in the flag F0 in the comparison sub-instruction CMPEQ, a judgement of condition is completed when the PC controlling part 13 produces a description (for example, a logical value of '1') for showing that the execution condition is satisfied, and a branch is executed based on the control signal 11 held in the register 30 in response to the description. Specifically, the PC controlling part 13 outputs a branch address (in this case, the address No. 1008) to the instruction RAM 6 through the IA bus, and sets the branch address in the PC at the next clock cycle in accordance with the third description of the control signal 11. Further, in accordance with the first description of the control signal 11, the PC controlling part 13 controls the instruction RAM 6 so as to give a dual operation instruction (sub-instructions I11 and I21) stored in the branch address No. 1008 to the instruction decode unit 2. The PC controlling part 13 controls the instruction decode unit 2, the memory unit 3 and the integer operation unit 4 so as to cancel pipeline processes of sub-instructions I51 and I52, which are already processed by the stages IF and D/A at the clock t7, and pipeline processes of sub-instructions I61 and I62, which are already processed by the stage IF, in accordance with the first description. However, the write back stages W of the sub-instructions I41 and I42, which are processed by the stage E/M at the clock t7, are proceeded to process without canceling.

The instruction decode unit 2 receives the dual operation instruction of the sub-instructions I11 and I12 existing in the address No. 1008, which are outputted from the instruction RAM 6, whereby the instruction fetch stage IF is processed at the clock t8. With respect to the sub-instructions I11 and I12, the instruction decode stages D/A, the instruction execution stages E/M and the write back stages W are processed respectively at the clocks t9, t10 and t11. The PC holds the address No. 1008 without change until the clock 10 at which the instruction execution stage E/M of the dual operation instruction in the address No. 1008 is processed and counts by every number of 8 at and after the clock t10.

Following the dual operation instruction of the sub-instructions I11 and I12, each dual operation instruction in the address No. 1010, 1018, 1020 is processed in the pipeline sequentially interposing an one-clock delay. Since the registers 30, 31, and 32 of the PC controlling part 13 holds the value held at the clock t3 without change, the PC controlling part 13 executes branching of the branch sub-instruction BRA by judging the same execution condition that a value of the flag F0 is '0' in reference of the flag F0 based on the contents of the registers 30, 31, and 32 at the clock t13 at which the PC holds the address No. 1020 again. Although it is not shown, the execution condition is determined by a renewal of the flag F0 which is a result of executing the sub-instruction I31 obtained at the clock t12.

When it is judged that the execution condition of the branch sub-instruction BRA is not satisfied at the clock t7, the PC controlling part 13 produces a description of showing that the execution condition is not satisfied (for example, a logical value of '0') and a branch is not executed without referring to the control signal 11 held in the register 30 in response to the description. The dual operation instruction of the sub-instructions I51 and I52 and the dual operation instruction of the sub-instructions I61 and I62 are successively processed without canceling the processes of pipeline stage thereof. Further, the contents held in the registers 30, 31, and 32 can be left without change until they are renewed by a next conditional branch sub-instruction, or can be reset completely.

Meanwhile, when the offset value of the CD field 404 with respect to the branch sub-instruction BFA is 0, the execution condition is judged at the clock t3 at which the PC value indicates the address No. 1000 which is the address of the branch sub-instruction itself and the branch is executed.

Another operation of the microprocessor 1 will be described using an example of program shown in FIG. 10. As in FIG. 8, two sub-instructions in each row are described by a dual operation instruction 101 having the instruction format shown in FIG. 2a; sub-instructions I01, I11, I21, I31, I41, I51, and I61 are described in the operation field 106 as operation_0; and sub-instructions I02, I12, I22, I32, I42, I52, and I62 are described in the operation field 107 as operation_1.

The sub-instruction I01 is a jump sub-instruction DJMP which jumps to an instruction in an address number held in the register R5 when an execution condition that the flag F0 is true (holding '1') is satisfied, wherein the jump instruction DJMP is a delayed jump sub-instruction having a format shown in FIG. 7. The sub-instruction I11 is an add sub-instruction ADD which writes a result of adding a content of the register R1 to a content of the register R2 in the register R1. The sub-instruction I21 is a comparison sub-instruction CMPEQ which compares a content of the register R1 with a content of the register R3, writes '1' in the flag F0 if these are equal, and writes '0' in the flag F0 if these are not equal. The sub-instruction I31 is an add sub-instruction which adds a content of the register R5 to a content of the register R6 and writes a result of the addition in the register R5. The sub-instructions I41, I51, I61, and I71 are arbitrary arithmetic operation sub-instructions of which stages E/M are processed in the memory unit 3, and other sub-instructions are arbitrary arithmetic operation sub-instructions of which stages E/M are processed in the integer operation unit 4.

In the execution condition field 401 corresponding to the sub-instruction I01, "CC=001" is described. And sub-instructions other than the sub-instruction I01 are sub-instructions which are executed unconditionally.

Also, in the CD field 404 corresponding to the sub-instruction I01, an offset value "18" is described.

Further, in a field for designating amount of execution delay (FIG. 7) of the sub-instruction I01, an offset value '28' is described as an immediate value.

Further, the dual operation instruction described in every row is an instruction for executing operations of two sub-instructions in parallel by setting "00" in the FM fields 103 and 104.

In the program of FIG. 10, a jump executed by the jump sub-instruction DJMP of the sub-instruction I01 is executed by judging the value of flag F0, which is a result of comparison by the sub-instruction I21, and an address of jump destination is determined by a result of addition in the sub-instruction I31. The dual operation instructions in the address Nos. 1020 and 1028 are executed despite whether or not a jump is taken by the jump instruction DJMP.

FIG. 11 shows operation of the microprocessor 1 which processes the program shown in FIG. 10 by a pipeline processing. As shown in FIG. 9, the clocks t1 through t13 respectively designate sequential one clock cycles, wherein processings of all pipeline stages in each clock cycle are conducted in parallel. The PC value has the same meaning as that in the FIG. 9.

With respect to the sub-instructions I01 and I02, the instruction fetch stages IF and the instruction decode stages D/A are processed in parallel respectively at the clocks t1 and t2. Although the instruction execution stage E/M and the write back stage W of the sub-instruction I02 is processed respectively at the clocks t3 and t4, the instruction execution stage E/M of the sub-instruction I01 is not subjected to a judgement of execution condition and not executed to branch based on the judgement before a permission is obtained.

The delayed jump sub-instruction DJMP as the sub-instruction I01 is decoded by the decoder 8 shown in FIG. 1, whereby a control signal 11 is outputted in response to a result of this decoding. In this control signal 11, a first description for controlling the PC controlling part 13 so as to take a branch of a jump sub-instruction DJMP, a second description for showing that the sub-instruction 101 is a sub-instruction of causing a delay of execution and a third description for showing a branch target address of the branch sub-instruction BRA are included. The third description is a register number designated by the jump sub-instruction DJMP.

At the clock t3, the PC controlling part 13 holds the control signal 11 to the jump sub-instruction DJMP in the register 30 without change and does not execute a branch based on the control signal 11. A value of CC=001, which is the execution condition field of the jump sub-instruction DJMP outputted from the instruction decode unit 2, is held in the register 31 without change. Further, the PC controlling part 13 receives an offset value "18" of the CD field of the jump sub-instruction DJMP from the instruction decode unit 2 and the address No. 1000 from the PC respectively at the clock t3 and adds these, wherein the register 32 holds a result of the addition, namely the address No. 1018. The PC controlling part 13 is comparing a value held in the register 32 and a value indicated by the PC. The PC controlling part 13 judges the execution condition of the jump sub-instruction DJMP at the first time based on the CC value held in the register 31 at a clock cycle at which the address value of the PC is equal to the address value of the register 32, namely at the clock t6.

Further, the PC controlling part 13 receives an offset value "28", which is the field for designating amount of execution delay 322 of the jump sub-instruction DJMP, from the instruction decode unit 2, receives the address No. 1000 from the PC at the clock t3 and adds these, wherein the register 33 holds a result of the addition, namely the address No. 1028. The PC controlling part 13 is comparing a value held in the register 33 with a value indicated by the PC. A jump by the jump sub-instruction DJMP is executed at the first time at a clock cycle at which the address value of the PC is equal to the address value of the register 33, namely the clock t8.

With respect to the sub-instructions I11 and I12, the instruction fetch stages IF, the instruction decode stages D/A, the instruction execution stages E/M and the write back stages W are processed in parallel respectively at the clocks t2, t3, t4, and t5. In the add sub-instruction ADD of the sub-instruction I11, a content of the register R1 and a content of register R2 are added by ALU 15 in the stage E/M, and a result of the addition is written in the register R1 in the stage W.

With respect to the sub-instructions I21 and I22, the instruction fetch stages IF, the instruction decode stages D/A and the instruction execution stages E/M are processed in parallel respectively at the clocks t3, t4 and t5. In the comparison sub-instruction CMPEQ as the sub-instruction I21, a content of the register R1 and a content of the register R3 are compared by ALU 15 in the execution stage E/M of the clock t5; '1' is written in the flag F0 if these are equal; and '0' is written in the flag F0 if these are not equal.

In a case of the comparison sub-instruction CMPEQ, the write back stage W does not exist. On the other hand, the write back stage W of the sub-instruction I32 is processed at the clock t7.

The execution condition of the jump sub-instruction DJMP is judged at the clock t6 because the flag F0 which is the result of operation of the sub-instruction I21 should be referred to. At the clock t6, the PC controlling part 13 refers to the flag F0 in accordance with a value of '001' held in the register 31, determines to take a branch if the flag F0 is '1', and determines not to take the branch if the flag F0 is '0'. At the clock t6, a description of one bit for determining whether or not the branch is taken in the memory circuit 34 is set at the clock t6. However, the actual jump by the jump sub-instruction is not executed before the clock t8.

In this, a case that '1' is written in the flag F0 by the comparison sub-instruction CMPEQ and thereby the execution condition is satisfied will be considered.

In the memory circuit 34, '1' which is the description that the execution condition is satisfied is set. In accordance with the second description for showing that the jump sub-instruction DJMP of the control signal 11 held in the register 30 is a delayed jump sub-instruction, the PC controlling part 13 checks whether or not the address value held in the register 33 is still in agreement with the PC value. If it is determined that the execution condition is satisfied, since these are not in agreement with at the stage of clock t6, the PC controlling part 13 does not execute the branch in accordance with the first description and the third description of the control signal 11 held in the register 30.

With respect to the sub-instructions I31 and I32, the instruction fetch stages IF, the instruction decode stages D/A, the instruction execution stages E/M and the write back stages W are processed in parallel respectively at the clocks t4, t5, t6, and t7. In the add sub-instruction DD of the sub-instruction I31, a content of the register R5 and a content of the register R6 are added in the stage E/M and a result of the addition is written in the register R5 in the stage W.

With respect to the sub-instructions I41 and I42, the instruction fetch stages IF, the instruction decode stages D/A, the instruction execution stages E/M and the write back stages W are processed in parallel respectively at the clocks t5, t6, t7, and t8. With respect to the sub-instructions I51 and I52, the instruction fetch stages IF, the instruction decode stages D/A, the instruction execution stages E/M and the write back stages W are processed in parallel respectively at the clocks t6, t7, t8, and t9.

The jump by the jump sub-instruction DJMP is executed at the clock t8 since the register R5 which indicates a result of the operation by the sub-instruction I31 should be referred to. At the clock t8 held in the register 33 is in agreement with PC value. Then, in accordance with an even that '1' is held in the memory circuit 34, the PC controlling part 13 processes the instruction stage E/M of the jump sub-instruction DJMP at the clock t8. The PC controlling part 13 takes a branch based on the control signal 11 held in the register 30. Since the sub-instruction I51 is an arithmetic sub-instruction and the processing of the instruction execution stage E/M is performed in ALU 15 not in the PC controlling part 13, the stages E/M of the sub-instructions I01 and I51 can be processed in parallel.

Specifically, in accordance with the third description of the control signal 11, the PC controlling part 13 outputs the branch target address (for example, the address No. 2000) held in a register designated by the third description to the instruction RAM 6 through the IA bus and sets the branch address in the PC at the next clock cycle. Further, in accordance with the first description of the control signal 11, the PC controlling part 13 controls the instruction RAM 6 so as to give the dual operation instruction stored in the branch target address No. 2000 to the instruction decode unit 2. Further, the PC controlling part 13 controls the instruction decode unit 2, the memory unit 3 and the integer operation unit 4 so as to cancel the pipeline processings of the sub-instructions I61 and I62, of which the stages IF and D/A are already processed and the sub-instructions I71 and I72, of which stages IF are processed at the clock t8 in accordance with the first description. However, the write back stages W of the sub-instruction I51 and I52, of which stage E/M are processes at the clock t8, are processed without cancellation.

The instruction decode unit 2 receives the dual operation instruction in the address No. 2000 outputted from the instruction RAM 6, wherein each instruction fetch stage IF of the dual operation instruction is processed at the clock t9, and succeedingly, the stages D/A, E/M and W are sequentially processed at each one clock cycle.

Further, in a case that the execution condition of the jump sub-instruction is not satisfied at the clock t6, a description of '0' which means that the execution condition of the jump sub-instruction is not satisfied is held in the memory circuit 34 at the clock t6. In addition, if the address value held in the register 33 at the clock t8 is equal to the PC value, the PC controlling part 13 does not take a branch without referring to the control signal 11 held in the register 30 in accordance with an event that '0' is held in the memory circuit 34. Processing in each pipeline stage of the dual operation instruction of the sub-instructions I61 and I62 and the dual operation instruction of the sub-instructions I71 and I72 is successively conducted without cancellation. Contents held in the registers 30, 31, 32, and 33 and the memory circuit 34 can be left as these are, until they are renewed by a next conditional branch sub-instruction, or can be reset completely.

As another method, it is possible to rewrite from the control signal 11 held in the register 30 to a control signal by which the PC controlling part 13 is controlled to invalidate the jump, namely, not to execute the jump, in accordance with a description indicating that the condition is not satisfied by judging the condition at the clock t6. If the description showing that the condition is satisfied is produced, the control signal 11 of the register 30 is held without change. In this case, it is not necessary to provide the memory circuit 34 which is referred to at the time of executing the jump actually at the clock t8.

Needless to say, as for the delayed jump sub-instruction DJMP or the delayed branch sub-instruction DBPA, it is possible to execute a branch at the same cycle as the clock cycle at which the execution condition is judged by changing a value of the field for designating amount of execution delay 322.

It is not limited to a conditional branch or a jump sub-instruction to delay a time for judging an execution condition. It is possible to delay a time for judging execution conditions designated by the fields for designating condition 401 through 403 by the CD formats 404 through 406 in execution processings of two arbitrary sub-instructions of a dual operation instruction and of an arbitrary single operation instruction 102. This can be realized by providing the registers 40 through 42 of the memory controlling part 14, the registers 50 through 52 of ALU 15, the registers 60 through 62 of the shifter 16, the registers 70 through 72 of the multiplier 17, the registers 80 through 82 of ALU 19 and the registers 90 through 92 of the shifter 20 every registers having the same structure and the same function as those of the registers 30 through 32 of the PC controlling part 13.

For example, a case that the sub-instruction I12 of the program shown in FIG. 8 is represented by the following formula A will be considered.

I12(ADD F1T R13 R8, R8, R9)　　　　　　　FORMULA A

This is an add sub-instruction which adds a content of the register R8 to a content of the register R9 when an execution condition that the flag F1 is true is satisfied and writes a result of the addition in the register R8, wherein a judgement of the execution condition is conducted at a clock cycle at which the PC value is the address value held in the register R13. CC=011 is described in the field for designating condition 402 and the register No. '13' is described in the CD field 405. The address No. 1018 is held in the register 13.

In FIG. 9, the instruction execution stage E/M of the sub-instruction I12 is processed at the clock t4. However, if the sub-instruction I12 is an add sub-instruction as shown in Formula A, the instruction execution stage E/M is processed at the clock t6.

The sub-instruction I12 is decoded by the decoder 9 at the clock t3, wherein the control signal 12 is outputted in response to a result of the decoding. In this control signal 12, there is included a first description for controlling ALU 19 so as to execute an add sub-instruction and a second description for designating the registers R8 and R9 which are used for the operation.

At the clock t4, ALU 19 holds the control signal 12 in its register 80 without change and does not execute the addition. A value of CC=011 which is the execution condition field outputted from the instruction decode unit 2 is held in the register 81 without change. Further, ALU 19 receives the register No. '13' which is the CD field from the instruction decode unit 2 and holds it without change. ALU 19 is comparing a value held in the register of the number '13' held in the register 82 with a value indicated by the PC. ALU 19 judges an execution condition of the add sub-instruction at the first time based on the CC value held in the register 81 at the clock t6, which is the clock cycle at which an address value in the PC is equal to the address No. 1018. ALU 19 produces a description showing whether or not the execution condition is satisfied.

ALU 19 performs the add operation at the same clock t6 based on the control signal 12 held in the register 80 according to the description and makes a designated general purpose register 5 hold a result of the addition at the clock t7 when the condition is satisfied. When the condition is not satisfied, the control signal 12 is ignored and the add operation is not performed.

As another means applicable when the condition is not satisfied, although ALU 19 can perform the add operation based on the control signal 12, ALU 19 is constituted so as not to write the result of the addition in the register designated by the add operation instruction in accordance with the description showing whether or not the execution condition is satisfied.

An operation sub-instruction, namely, a comparison sub-instruction which compares two values and reflects a result of whether these are equal or non-equal or a result of which is larger in the flag F1, for determining a value of the flag F1, which is the execution condition of the add sub-instruction of Formula A, can be put in a sub-instruction positioned in a lower address than the sub-instruction I12 in the program sequence, for example, the position of the sub-instruction I22.

In each of the CD fields 404, 405, and 406, descriptions showing that execution conditions designated by fields for designating execution condition are judged in the instruction decode stage D/A of operation sub-instructions described in each operation field can be described in addition to the description of offset value and the description which designate registers.

For example, in FIG. 8, when the CD field 404 corresponding to the branch sub-instruction BRA of the sub-instruction I01 has a description indicating that an execution condition is judged in the instruction decode stage D/A, the instruction decode unit 2 starts the judgement of the execution condition in response to the CD field 404 and refers to a content of the designated flag F0 in PSW10 in accordance with the field for designating condition 401 at the clock t2. Then the instruction decode unit 2 outputs a fourth description showing whether or not the execution condition of the sub-instruction I01 is satisfied. Further, the instruction decode unit 2 forms a control signal 11 based on a result of decoding by the field for designating operation of the branch sub-instruction BRA by the decoder 8. In the control signal 11, there are included a first description for controlling the PC controlling part 13 so as to take a branch of the branch sub-instruction BRA, a second description representing an ordinary instruction which does not cause a delay of branch execution and a third description indicating a branch target address of the branch sub-instruction BRA.

In a case that the execution condition is satisfied, the instruction decode unit 2 outputs a description that the execution condition is satisfied as the fourth description, namely, it can be executed unconditionally in the PC controlling part 13. The PC controlling part 13 receives the description indicative of the unconditionalness and conducts the branch in accordance with the control signal 11 at the clock t3 without holding the control signal 11 in the register 30.

In a case that it is judged that the execution condition is not satisfied, the instruction decode unit 2 outputs a description indicating that the operation is invalid as the fourth description. The PC controlling part 13 does not execute the branch even if the control signal 11 is received in accordance with the description indicating that the operation is invalid.

As for other kinds of operating sub-instructions than the branch sub-instruction, the above process is similarly applicable. However, in an arithmetic operation such as an addition, in the case that the operation is judged to be invalid in the instruction decode stage D/A, it is possible not to write a result of the operation in a register designated by the operation instruction even though the operation unit executes the arithmetic operation.

In addition, if instructions such as the branch sub-instruction DBFA and the jump sub-instruction DJMP, both of which having a function of delay, are not prepared in the microprocessor shown in FIG. 1, it is not necessary to provide the register 33 and the memory circuit 34 in the PC controlling part 13.

Although the registers as an means for delaying a time for judging execution conditions are provided respectively in the PC controlling part 13, the memory controlling part 14, ALU 15, ALU 19, the shifter 16, the shifter 20, and the multiplier 17, the registers can be provided in a selected part of these operation units of the instruction execution unit.

For example, among the operation sub-instructions to be executed under a predetermined condition, a conditional branch sub-instruction or a conditional jump sub-instruction is used most frequently in a program made by a user. Accordingly, in a processing of only a branch sub-instruction, a function of delaying a time for judging the execution condition may be used. In this case, the registers 30, 31, and 32 are provided in only the PC controlling part 13.

In the above, when the execution condition field designates the unconditional execution of CC=000, the value of the CD field corresponding to the execution condition field is ignored by the unit 2, 3 and 4 and the sub-instruction corresponding to the execution condition field is decoded and executed in continuous one clock cycles. However, without disregarding the CD field, the sub-instruction may be decoded and unconditionally executed by delay the value of the CD field after decoding.

As mentioned in the above, this embodiment has the following characteristics.

(1) For example, in a case of an operation sub-instruction to be executed unconditionally such as the sub-instruction I31 shown in FIG. 8 or an operation sub-instruction of which condition is determined in its decode stage even though it is conditional, the instruction is decoded in the period of clock t5; and an operation designated by the sub-instruction I31 is executed in the period of clock t6 succeeding to the period of clock t5, within a delay amount of the above conditional operation sub-instruction. On the other hand, the conditional operation sub-instruction such as the sub-instruction I01 is decoded in the period of clock t2; and a judgement of the execution condition of branch operation is started at the clock t7 after a period at least longer than the clock t6, which is a period of processing the instruction execution stage E/M such as the sub-instruction I31, from the clock t2. In other words, a time for judging the execution condition is delayed by a delay amount of the period between the clock t3 and the clock t6. Accordingly, as in the program sequence shown in FIG. 8, the conditional operation sub-instruction can be put in a point earlier than the operation sub-instruction (the sub-instruction I31), which performs the operation for determining the execution condition of the operation sub-instruction. In a conventional processor, there is a possibility that a sub-instruction other than the NOP sub-instruction cannot be put in the position of the sub-instruction I01. However, when the processor described in this embodiment is adopted, a conditional operation sub-instruction can be put as the sub-instruction I01 and a scheduling of instructions can be flexible.

(2) For example, it is possible to variably set a delay amount representing a time for judging execution conditions of operations held in the registers 32, 42, and so on of each operation unit. Accordingly, for example in the sub-instruction I01, the execution condition is judged at various clock cycles including the clock t4. Therefore, it is possible to appropriately change the position of conditional operation sub-instruction in accordance with a content of the program at the time of scheduling the sub-instructions. In particular, because values held in the registers 32, 43, and so on are set in accordance with contents described in the CD fields 403, 404, and 405 of a sub-instruction format constituting a program, a programmer or a compiler can easily determine an extent of the delay amount in response to the conditional operation sub-instruction.

(3) Various formats can be used for a description as the delay amount held in the registers 32, 42, and so on. It is possible to hold a clock number as the delay amount. In this case, the registers 32, 42, and so on are constituted as a subtraction counter. For example in the PC controlling part 13, the clock number of 4 is held in the register 32 at the clock t3; the clock number is subtracted in accordance with the counter; and starts a judgement of condition at the clock t7 at which the clock number of 0 is held. However, in this embodiment, an address value is held as the delay amount representing the time for judging the execution condition of operation; and the execution condition is judged at a clock cycle equal to a value of the program counter of the address value. Accordingly, it is more effective because the delay amount is controlled by the PC value. For example, in a case that the program shown in FIG. 8 is constituted to jump to another instruction between the address No. 1008 and the address No. 1020 and return thereafter, it is not necessary to adjust a time for judging execution by changing the values of the register values 32, 42, and so on, whereby a control becomes easy. If the above clock number is held, it is necessary to apply measures such that a subtracted value at the time of jumping to another instruction is evacuated.

(4) In a case of a conditional delayed branch sub-instruction or a conditional delayed jump sub-instruction, a branch condition is judged at the clock t6 as shown in FIG. 11 and the branch is executed at the clock t8 which starts after elapsing one clock cycle or more. If the sub-instructions I41 and I42 are sub-instructions which rewrites the flag 0 which determines the execution condition of the jump sub-instruction DJMP at the clock t7, it is possible to use a jump sub-instruction without delay, which executes the jump at the same clock cycle as that for judging the execution condition, as the sub-instruction I01. Accordingly, the conditional delayed operation sub-instruction as described in this embodiment can make an instruction scheduling in a program more flexible.

(5) Each operation unit, for example the PC controlling part 13, holds the control signal 11 for controlling the PC controlling part 13 so as to execute a first operation sub-instruction, a value of field for designating condition as the first description which indicates the execution condition of the first operation sub-instruction and an address value or a description designating a register holding the address value as the second description which indicates a time for judging the execution condition respectively in its registers 30, 31, and 32. Further, these register values are continuously held without change until they are rewritten by the second conditional operation sub-instruction which is decoded by the instruction decoder 2 after the first operation sub-instruction, in order to delay the time for judging the condition. This procedure is effective when a loop process formed by the conditional operation sub-instruction is conducted. If a description is temporarily held in the registers 30, 31, and 32 beforehand, the conditional operation sub-instruction is executed by using only the descriptions held in the registers 30, 31, and 32 at each occurrence of loop. According to conventional techniques, it was necessary to decode by a decoder after fetching a conditional operation sub-instruction from an instruction RAM at each occurrence of loop. However, in this embodiment, it is sufficient to fetch the operation sub-instruction of the sub-instruction I01 only once and decode the same, whereby the processing efficiency of microprocessor can be high.

(6) In this embodiment, all sub-instructions to be processed by the microprocessor has the format shown in FIG. 2; fields for designating condition are provided corresponding to fields for designating operation therein; and further fields for designating amount of delay for judging condition are provided corresponding to the fields for designating condition. The fields for designating condition can designate an unconditional execution. In other words, because a space for inserting a description designating whether the sub-instruction is conditional or not, a content of the condition if conditional and a description for indicating a time for judging the condition is secured, whereby a programmer or a compiler can easily constitute sub-instructions.

(7) In the fields for designating amount of delay for judging condition, it is possible to designate judging in the decode stage of sub-instruction by the instruction decode unit 2 as a time for judging the condition. The instruction execution unit performs an operation as a sub-instruction executable unconditionally if the condition of the sub-instruction is satisfied. This also gives flexibility to a scheduling of the instruction.

(8) Further, the following modification can be considered. The value referred to at the time of determining the condition in processing the conditional operation sub-instruction is the flag F0. However, it is not limited to this and the referred value can be a register value holding a plurality of bits.

The microprocessor in this embodiment processes a plurality of pipelines in parallel by adopting a VLIW architecture. However, a function of delaying the time for judging condition in this conditional operation sub-instruction is effective if it is provided in the processor which processes a single pipeline.

(9) Each operation unit is provided with a set of three registers which are a means for delaying the time for judging condition. However, it is possible to further provide one set or plurality sets of three registers having the same function as these three registers in each operation unit. This structure is effective in a case that one loop or plurality loops exist in the loop formed by the program shown in FIG. 8.

A program constituted as follows will be considered as an example:

Address No. 100: I01 (BRA F0F #H30 110)
Address No. 108: I11 (BRA F1T #H18 118)
Address No. 110: I21
Address No. 118: I31
Address No. 120: I41
Address No. 128: I51
Address No. 130: I61

In this, the sub-instruction I0.1 is a branch sub-instruction which branches to the address No. 110 if the flag F0 is false, wherein the branch is executed by judging an execution condition at a cycle of instruction execution stage of the sub-instruction I61. The sub-instruction I11 is a branch sub-instruction which branches to the address No. 118 if the flag F1 is true, wherein the branch is executed by judging an execution condition in an instruction execution stage of the sub-instruction I41 in the address No. 120. A first loop is formed by the address Nos. 110 through 130 and a second loop is formed by the address Nos. 118 through 120 in this program.

In a case that the sub-instruction I01 is decoded, a control signal 11 with respect to the branch sub-instruction of the sub-instruction I01, a description designating the condition and a description designating a time of judging the condition are held in the registers 30 through 32 of the PC controlling part 13. In a case that the sub-instruction I11 is decoded succeedingly to the sub-instruction I01, the three registers which are further provided in the PC controlling part 13 hold a control signal 11 with respect to the branch sub-instruction of the sub-instruction I11, a description designating the condition and a description designating a time for judging the condition. By this, the two conditional operation sub-instructions can be executed appropriately by referring to only the descriptions held in the registers 30, 31, and 32 and the descriptions held in the three registers having the same function respectively, at each occurrence of the first loop and the second loop. Therefore, it is not necessary to fetch the sub-instructions I01 and I02 at every occurrence of the loops and to decode the sub-instructions, whereby a processing performance of the processor can be enhanced.

Embodiment 2

Figure 12:
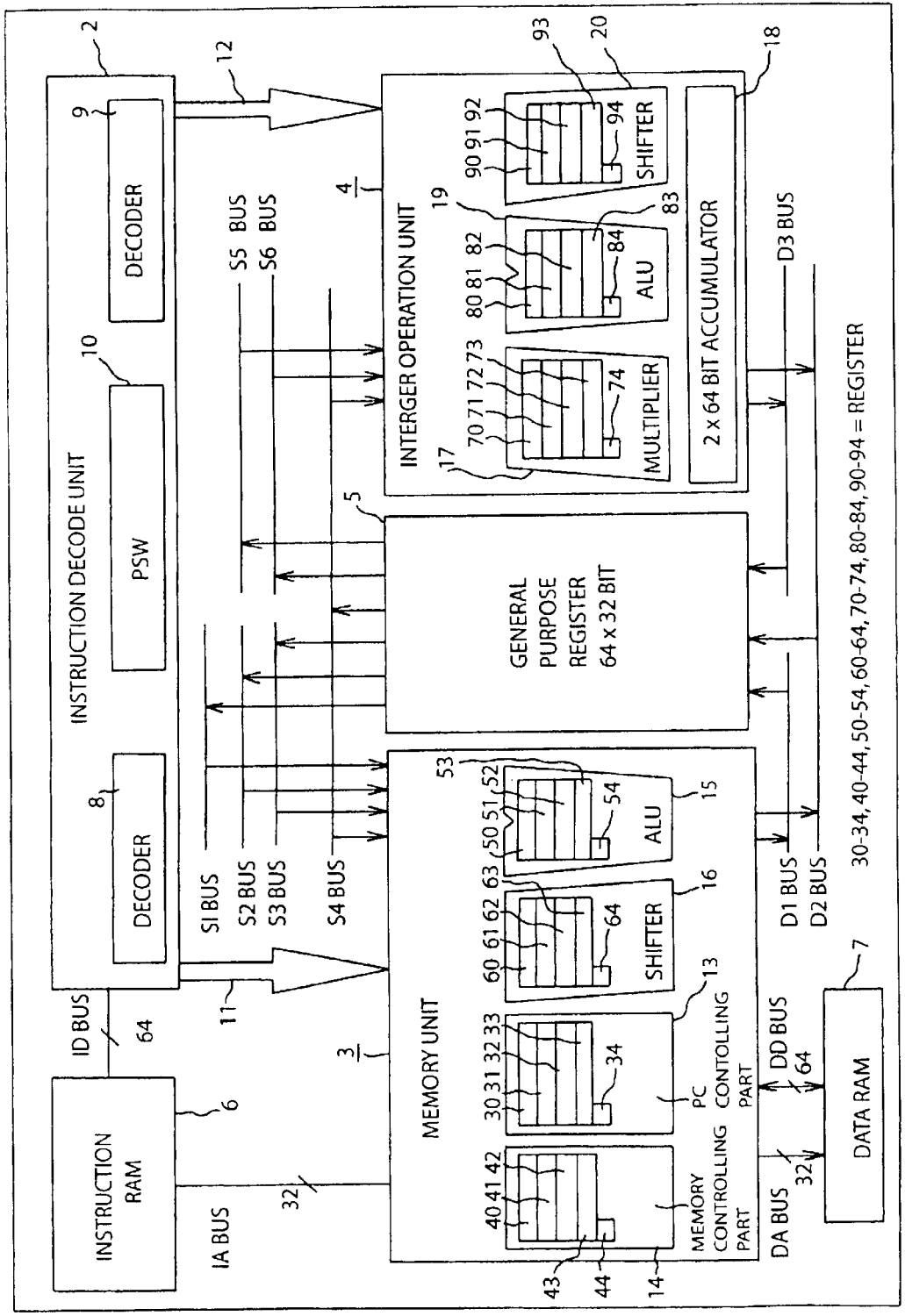
FIG. 12 is a block chart for schematically showing a constitution of the microprocessor according to Embodiment 2 of the present invention.

FIG. 12 shows a constitution of a microprocessor other than that shown in FIG. 1.

In this microprocessor, a register 43 and a memory circuit 44 are provided in a memory controlling part 14; a register 53 and a memory circuit 54 are provided in ALU 15; a register 63 and a memory circuit 64 are provided in a shifter 16; a register 73 and a memory circuit 74 are provided in a multiplier 17; a register 83 and a memory circuit 84 are provided in ALU 19; and a register 93 and a memory circuit 94 are provided in a shifter 20. A part of the constitution which has not been described in the above is the same as that shown in FIG. 1.

In the microprocessor shown in FIG. 1, the operation sub-instruction having a delay function, namely an operation sub-instruction which executes the operation at a clock cycle positioned after a clock cycle for judging a condition, is only a branch sub-instruction and a jump sub-instruction. However, it is possible to add a delay function to arbitrary operation sub-instructions such as a load/store sub-instruction, an arithmetic operation, and a shift arithmetic operation. The six registers which are further added to each operation unit have completely the same function as that of the register 33 of the PC controlling part 13 and hold a description indicating a time for executing an operation to be executed in each operation unit. Further, the six memory circuits which are further added to each operation unit have completely the same function as these of the memory circuit 34 of the PC controlling part 13 and hold a description of a result of judging an execution condition of the operation to be executed in each operation unit.

For example, so constituted microprocessor can prepare a sub-instruction as follows:

DADD F0T #H20, H30 R5, R5, R6

This sub-instruction is an add sub-instruction which adds a content of the register R5 to a content of the register R6 under a condition that the flag F0 is true and writes a result of the addition to the register R5. This add sub-instruction has two offset values '20' and '30' as immediate values. If an address of the add sub-instruction DADD is No. 2000, the condition of the add sub-instruction DADD is judged at a clock cycle at which the instruction execution stage E/M of an operation sub-instruction positioned at address No. 2000+20=2020 is processed. And, the add operation is executed at a clock cycle at which the execution stage E/M of an operation instruction of the address No. 2000+30= 2030 is processed. If the add sub-instruction DADD is operation_0 in FIG. 2, the addition is conducted by judging the condition in ALU 15; and if it is operation_1, the addition is conducted by judging the condition in ALU 19.

Needless to say, in this embodiment 2, although a register and a memory circuit are added to each operation unit, these can be provided in only selected operation units among the plurality of the operation units. In such a case, a delay function is added to only operation sub-instructions by which the operation units having these registers and memory circuits can process.

As described in the above, the first advantage of a data processing device according to the present invention is that a degree of freedom in scheduling instructions is increased by enabling a second operation instruction to be described prior to another operation instruction for determining an execution condition of the second operation instruction in a program sequence, because a first operation instruction is decoded in a first period and executed in a second period succeeding thereto, while the second operation instruction of which operation is executed under a predetermined condition is decoded in a third period and executed by judging the condition after passing at least the same time as the second period from the ending of the third period in a fourth period, wherein even though a conditional operation instruction is decoded, the instruction is executed by delaying a time for judging the execution condition not like the first operation instruction which is executed immediately, whereby it is possible to execute the operation instruction which determines the execution condition of the second operation instruction during the delay.

The second advantage of a data processing device according to the present invention is that a degree of freedom in scheduling instructions can further be increased because a time for executing the operation designated by the second operation instruction can further be delayed from the time for judging the condition, whereby the conditional operation instruction can be appropriately executed even though a value which determines the condition of the second operation instruction is overwritten by processings of other operation instructions during the delay.

The third advantages of a data processing device according to the present invention is that a degree of freedom in scheduling instructions is increased because a first register through a third register which are used at a time of processing a conditional operation instruction are provided in an instruction execution unit, wherein the first register holds a control signal outputted from an instruction decoder; the second register holds a first description indicating an execution condition of an operation designated by the conditional operation instruction; the third register holds a second description indicating a time for starting judgement of the condition; and the operation instruction is executed by judging the condition after a predetermined time is elapsed from the decoding of the operation instruction based on these three descriptions, whereby an operation instruction which determines an execution condition of a second operation instruction is executed during the delay in scheduling the instructions.

Obviously, numerous modifications and variations of the present invention are possible in light of the above teachings. It is therefore to be understood that within the scope of the appended claims, the invention may be practiced otherwise than as specifically described herein.

What is claimed is:

1. A data processing device comprising:
    an instruction decoder for sequentially decoding a plurality of instructions described in a program sequence and outputting control signals respectively corresponding to the instructions, and
    an instruction execution unit for executing operations respectively designated by said plurality of instructions in accordance with said control signal output from said instruction decoder, wherein
    said instruction decoder decodes a first instruction among said plurality of instructions and outputs a first control signal in a first period;
    said instruction execution unit executes the operation designated by said first instruction in accordance with said first control signal in a second period succeeding to said first period;
    said instruction decoder outputs a second control signal in a third period by decoding a second instruction of which operation is executed under a predetermined condition among said plurality of instructions; and
    said instruction execution unit determines whether or not said predetermined condition is satisfied in a fourth period and executes the operation designated by said second instruction in response to a result of the determination, said fourth period being started after elapsing a same time as said second period or longer from an ending of said third period.

2. A data processing device according to claim 1 further comprising:
    a register for designating amount of delay which can variably set a value to be held therein, wherein,
    said instruction execution unit starts the judgement of weather or not said second operation instruction satisfies the predetermined condition in response to the value held in the register for designating amount of delay as an amount of delay.

3. A data processing device according to claim 2, wherein
    said second instruction has a field for designating operation and a field for designating amount of delay, which designates an interval between the ending of said third period and the starting of said fourth period; and
    the amount of delay is set in the register for designating amount of delay in accordance with a content described in said field for designating amount of delay.

4. A data processing device according to claim 2 further comprising:
    a program counter for sequentially counting addresses respectively corresponding to the plurality of instructions and holding the addresses, wherein
    said register for designating amount of delay hold an address value to designate the amount of delay; and
    the instruction execution unit starts the judgement of whether or not said second instruction satisfies the predetermined condition in response to an event that the address value held in said register for designating amount of delay is in agreement with a value of the program counter.

5. A data processing device according to claim 1, wherein
    the instruction execution unit determines whether or not the predetermined condition is satisfied in a fifth period included in said fourth period and executes the operation designated by said second instruction in a sixth period when said predetermined condition is satisfied, said sixth period being included in said fourth period and starting after elapsing the same time as said second period or longer from an ending of said fifth period.

6. A data processing device according to claim 5 further comprising:
   a first register for designating amount of delay and a second register for designating amount of delay both of which can variably set values to be held respectively therein, wherein
   said instruction execution unit starts the judgement of whether or not said second instruction satisfies the predetermined condition in accordance with a value held in said first register for designating amount of delay as an amount of a first delay and starts to execute the operation designated by said second instruction when the predetermined condition of said second instruction is satisfied in accordance with a value held in said second register for designating amount of delay as an amount of a second delay.

7. A data processing device according to claim 6, wherein
   said second instruction has a field for designating operation, a field for designating amount of first delay which designates a time between the ending of said third period and the starting of said fourth period and a field for designating amount of second delay which designates a time between the ending of said fifth period and the starting of said sixth period; and
   the amount of said first delay is set in said first register for designating amount of delay in accordance with a content described in said field for designating amount of first delay and the amount of said second delay is set in said second register for designating amount of delay in accordance with a content described in said field for designating amount of said second delay.

8. A data processing device according to claim 6 further comprising:
   a program counter which sequentially counts addresses respectively corresponding to the plurality of instructions and holds the addresses, wherein
   said first register for designating amount of delay and said second register for designating amount of delay hold address values respectively as the amount of said first delay and the amount of said second delay;
   said instruction execution unit starts to judge whether or not the predetermined condition is satisfied in response to and event that the address value held in said first register for designating amount of delay is in agreement with a value of the program counter and starts to execute the operation designated by the second operation instruction when the predetermined condition is satisfied in response to and event that the address value held in said second register for designating amount of delay is in agreement with the value of the program counter.

9. A data processing device according to claim 1, wherein
   the instruction decoder decodes a third instruction among the plurality of instructions in a seventh period which is started after said third period, in order to output a third control signal;
   the instruction execution unit executes an operation designated by said third instruction in accordance with said third control signal and writes a result of the operation in a predetermined memory location in an eighth period which is started after said seventh period;
   said second instruction designates an operation to be executed in a case that the operation result of said third operation instruction has a predetermined value; and
   said instruction execution unit determines whether or not the operation designated by said second instruction is executed in reference of the predetermined memory location so that the starting of said fourth period is at least later than said eighth period.

10. A data processing device according to claim 9, wherein
    the predetermined memory location is a flag or a register; and
    said third instruction is a comparison instruction which compares values of two registers and writes a result of the comparison in the predetermined memory location.

11. A data processing device according to claim 1, wherein
    the second operation instruction is a branch instruction, a jump instruction or an add instruction.

12. A data processing device according to claim 1, wherein
    each of the plurality of instructions has a field for designating an operation which designate contents of the operation, a field for designating a condition which designates an execution condition of the operation and a field for designating amount of delay which designates an amount by which timing for judging the execution conditions is delayed;
    said first instruction is an instruction that is unconditionally executed and a description indicating an unconditionality is described in said field for designating the condition of said first instruction;
    a description indicating a condition and a description indicating an interval between the ending of said third period and the starting of said fourth period are described respectively in said fields for designating the condition and the amount of delay of said second instruction;
    the instruction decoder outputs the first control signal in accordance with said field for designating the operation of said first instruction and controls the instruction execution unit so that the instruction execution unit executes unconditionally the operation designated by said first instruction in said second period based on said field for designating the condition of said first instruction; and
    the instruction decoder outputs said second control signal in accordance with said field for designating the operation of said second instruction, controls the instruction execution unit so as to judge whether or not the condition is satisfied in said fourth period in accordance with said field for designating the amount of delay and controls the instruction execution unit so as to determine whether or not the condition is satisfied in accordance with said field for designating the condition of said second instruction.

13. A data processing device according to claim 1, wherein each of the plurality of instructions has a field for designating an operation which designates the contents of the operation, a field for designating a condition which designates the execution condition of the operation and a field for designating an amount of delay which designates the amount by which timing for judging the execution condition is delayed;
    said first instruction is a conditional instruction;
    a description indicating a first condition different from a second condition which is the predetermined condition of said second instruction is described in said field for designation the condition and a description indicating that said first condition should be judged in said first period is described in said field for designating the amount of delay respectively of said first instruction;

a description indicating said second condition is described in said field for designating the condition and a description indicating the interval between the ending of said third period and the starting of said fourth period is described in said field for designating the amount of delay respectively of said second instruction;

the instruction decoder outputs said first control signal in accordance with said field for designating the operation of said first instruction and controls said instruction execution unit so as to execute the operation designated by said first instruction based on said field for designating the condition and said field for designating the amount of delay of said first instruction in said second period;

said instruction decoder outputs said second control signal in accordance with the field for designating the operation of said second instruction, controls said instruction execution unit so as to judge whether or not said second condition is satisfied in accordance with said field for designating the amount of delay of second instruction in said fourth period, and controls said instruction execution unit so as to determine whether or not said second condition is satisfied in accordance with said field for the condition of said second instruction.

14. A data processing device comprising:

an instruction decoder which sequentially decodes a plurality of instructions described in a program sequence and outputs a control signal corresponding to each instruction, and an instruction execution unit which executes operations designated by the plurality of instructions in accordance with the control signals output from said instruction decoder, wherein when one of said plurality of instructions is a conditional instruction for designating an operation to be executed under a condition, said instruction decoder outputs a first control signal by decoding said conditional instruction;

said instruction execution unit includes a first register for holding a first description indicating a timing for starting a determination of said condition; and said instruction execution unit starts to determine whether or not said condition is satisfied in response to an event that the timing for starting the determination of the condition is detected based on said first description held in said first register, and starts to execute the operation designated by said conditional instruction in accordance with said first control signal and a result of the determination.

15. A data processing device according to claim 14, wherein said first description held in said first register can be variably set.

16. A data processing device according to claim 14, further comprising:

a program counter which sequentially counts an address corresponding to each of the plurality of instructions and holds the address, wherein an address value is held in said first register as said first description; and said instruction execution unit, detects an event that the address value held in said first register is in agreement with an address of said program counter and starts to determine whether or not said condition is satisfied in response to the detection.

17. The data processing device according to claim 14, wherein said instruction execution unit further includes a second register for holding said first control signal output from said instruction decoder and a third register for holding a second description indicating the condition, said instruction execution unit performing the determination based on the second description held in said third register, reading the first control signal from said second register in response to the result of the determination, and executing the operation in accordance with the first control signal read from said second register.

18. A data processing device according to claim 17, wherein said conditional instruction has a field for designating an operation which designate contents of the operation, a field for designating condition which designates the executing condition of the operation and a field for designating an amount of delay which designate a timing for determining the execution condition;

said instruction decoder produces said first control signal based on contents described in said field for designating operation, outputs the second description in accordance with the contents described in said field for designating the condition and outputs the contents described in said field for designating the amount of delay;

said second description output from said instruction decoder is held in said third register; and said instruction execution unit writes said first description in said first register in accordance with said field for designating the amount of delay output from said instruction decoder.

19. A data processing device according to claim 14, wherein the instruction execution unit further has a second register for holding a second description indicating a timing for starting the operation designated by the instruction; and said instruction execution unit detects the timing for starting the operation designated by the instruction, determines whether or not the condition is satisfied in response to a result of the detection and starts the operation designated by the instruction in response to a result of the determination, in accordance with said second description.

20. A data processing device according to claim 19, further comprising:

a program counter for sequentially counting an address corresponding to each of the plurality of instructions and holds the address, wherein an address value is held in said first register as said first description;

an address value is held in said second register as said second description;

said instruction execution unit detects an event that the address value held in said first register is in agreement with an address of said program counter, starts to determine whether or not the condition is satisfied in response to the detection, detects an event that the address value held in said second register is in agreement with the address of said program counter and starts to execute the operation designated by said instruction in response to the detection.

21. A data processing device according to claim 19, wherein said conditional instruction has a field for designating an operation which designate contents of the operation, a field for designating a condition for designating an execution condition of the operation, a field for designating an amount of a first delay which designates a timing for determining the execution condition and a field for designating an amount of a second delay which designates a timing for starting the execution of the operation;

said instruction decoder produces said first control signal based on the contents described in said field for designating an operation, outputs the second description in accordance with the contents described in said field for designating a condition, and outputs the contents described in said field for designating in amount of said first delay and said field for designating an amount of said second delay, the second description output from said instruction decoder is held in said second register:

said instruction execution unit writes said first description in said first register in accordance with the contents described in said field for designating the amount of said first delay output from said instruction decoder and further writes said second description in said second register in accordance with the contents described in said field for designating the amount of said second delay output from said instruction decoder; and said instruction execution unit further includes a third register for holding said first control signal output from said instruction decoder and a fourth register for holding a third description indicating the condition, said instruction execution unit performing the determination based on the third description held in said fourth register, reading the first control signal from said third register in response to the result of the determination, and executing the operation in accordance with the first control signal read from said third register.

22. A data processing device comprising:

an instruction decoder decoding a condition instruction to output a control signal, said condition instruction specifying an operation to be executed under a condition and including a field specifying a timing of starting a determination whether the condition is satisfied; and an instruction execution unit starting a determination of the condition on the basis of the field of said condition instruction and executing the operation under a result of the determination.

23. The data processing device according to claim 22, further comprising:

a program counter for calculating and outputting an address specifying an instruction to be fetched, wherein said instruction execution unit includes a register into which a program counter value is written in accordance with the field of said condition instruction and starts the determination when detecting a coincidence of the program counter value held in said register with an address of said program counter.

24. The data processing device according to claim 23, wherein said condition instruction includes another field specifying a timing of starting the operation, said instruction execution unit including another register into which a program counter value is written in accordance with the other field of the condition instruction and starting to execute the operation when detecting a coincidence of the program counter value held in the other register with an address of said program counter.

25. The data processing device according to claim 22, wherein said condition instruction includes another field specifying a timing of starting the operation, said instruction execution unit starting to execute the operation on the basis of the other field of the condition instruction.

* * * * *